(12) United States Patent
Matsubara et al.

(10) Patent No.: US 12,459,826 B2
(45) Date of Patent: Nov. 4, 2025

(54) HOLLOW SILICA PARTICLES AND METHOD FOR MANUFACTURING HOLLOW SILICA PARTICLES

(71) Applicants: AGC Inc., Tokyo (JP); AGC SI-TECH CO., LTD., Kitakyushu (JP)

(72) Inventors: Toshiya Matsubara, Tokyo (JP); Hyunji Kim, Tokyo (JP); Hajime Katayama, Tokyo (JP); Yusuke Arai, Tokyo (JP)

(73) Assignees: AGC Inc., Tokyo (JP); AGC SI-TECH CO., LTD., Kitakyushu (JP)

( * ) Notice: Subject to any disclaimer, the term of this patent is extended or adjusted under 35 U.S.C. 154(b) by 573 days.

(21) Appl. No.: 17/891,320

(22) Filed: Aug. 19, 2022

(65) Prior Publication Data
US 2022/0411275 A1    Dec. 29, 2022

Related U.S. Application Data

(63) Continuation of application No. PCT/JP2021/006697, filed on Feb. 22, 2021.

(30) Foreign Application Priority Data

Feb. 27, 2020 (JP) ................................ 2020-032046
Sep. 25, 2020 (JP) ................................ 2020-161378
Sep. 25, 2020 (JP) ................................ 2020-161379

(51) Int. Cl.
*C01B 33/18* (2006.01)
*C09C 1/30* (2006.01)

(52) U.S. Cl.
CPC ............ *C01B 33/18* (2013.01); *C09C 1/3027* (2013.01); *C09C 1/3081* (2013.01);
(Continued)

(58) Field of Classification Search
None
See application file for complete search history.

(56) References Cited

U.S. PATENT DOCUMENTS 10,507,408 B2 * 12/2019 Wei ..................... B01J 20/28076
2009/0286070 A1   11/2009 Sueyoshi et al.
(Continued)

FOREIGN PATENT DOCUMENTS

CN      103937241 A    7/2014
EP      2 455 428 A1   5/2012
(Continued)

OTHER PUBLICATIONS

Machine translation of WO-2019131658 (Year: 2019).*
(Continued)

*Primary Examiner* — Michael Forrest
(74) *Attorney, Agent, or Firm* — Oblon, McClelland, Maier & Neustadt, L.L.P.

(57) ABSTRACT

The present invention related to a hollow silica particle including: a shell layer containing silica; and a space formed inside the shell layer, in which the hollow silica particle has a particle density as measured by a dry pycnometer density measurement using helium gas of 2.00 g/cm$^3$ or more and a particle density as measured by a dry pycnometer density measurement using oxygen gas of lower than 2.00 g/cm$^3$.

20 Claims, 5 Drawing Sheets

(52) U.S. Cl.
CPC ...... *C01P 2002/82* (2013.01); *C01P 2004/34* (2013.01); *C01P 2004/61* (2013.01); *C01P 2004/64* (2013.01); *C01P 2006/10* (2013.01); *C01P 2006/12* (2013.01); *C01P 2006/14* (2013.01)

(56) References Cited

U.S. PATENT DOCUMENTS

| | | | |
|---|---|---|---|
| 2012/0111231 | A1 | 5/2012 | Sueyoshi et al. |
| 2015/0259512 | A1 | 9/2015 | Sueyoshi et al. |

FOREIGN PATENT DOCUMENTS

| | | | |
|---|---|---|---|
| JP | 11-029318 | A | 2/1999 |
| JP | 4244323 | B2 | 3/2009 |
| JP | 2009-203116 | A | 9/2009 |
| JP | 2010-222147 | A | 10/2010 |
| JP | 2010-260755 | A | 11/2010 |
| JP | 2012-136363 | A | 7/2012 |
| JP | 2013-01 4506 | A | 1/2013 |
| JP | 2017-226567 | A | 12/2017 |
| WO | WO-2019131658 | A1 * | 7/2019 .............. B01J 13/08 |
| WO | WO-2019/189020 | A1 | 10/2019 |

OTHER PUBLICATIONS

Machine translation of JP2009203116 (Year: 2009).*
Extended European Search Report issued Jul. 31, 2024 in European Patent Application No. 21761133.4, 9 pages.
International Search Report issued Apr. 27, 2021 in PCT/JP2021/006697 filed on Feb. 22, 2021, 2 pages.

* cited by examiner

HOLLOW SILICA PARTICLES AND METHOD FOR MANUFACTURING HOLLOW SILICA PARTICLES

CROSS-REFERENCE TO RELATED APPLICATIONS

This is a continuation of International Application No. PCT/JP2021/006697 filed on Feb. 22, 2021, and claims priority from Japanese Patent Application No. 2020-032046 filed on Feb. 27, 2020, and Nos. 2020-161378 and 2020-161379 both filed on Sep. 25, 2020, the entire content of which is incorporated herein by reference.

TECHNICAL FIELD

The present invention relates to hollow silica particles and a method for manufacturing hollow silica particles.

BACKGROUND ART

Exhibiting various properties such as a low density, a low refractive index, and a substance containing ability, hollow particles are used in a broad range of fields such as lightweight materials, heat insulating materials, and color materials by utilizing these properties.

Whereas hollow particles include hollow resin particles and hollow inorganic particles, there is a recent trend of replacing hollow resin particles with hollow inorganic particles because of an increased concern about marine pollution by microplastics.

Typical examples of hollow inorganic particle include a hollow silica particle which is a particle having a space inside a shell layer formed of silica. Because of wide varieties in particle size, a pore structure of the shell layer, and surface physical properties, hollow silica particles are used widely in catalysts, catalyst carriers, cosmetic pigments, resin fillers, absorbents, desiccating agents, heat insulating materials, coating materials, drug delivery systems, and optical filters, etc. Furthermore, because of low refractive index obtained by their hollow shapes, hollow silica particles are also useful when used as antireflection coating materials.

Such hollow silica particles are proposed in a wide variety. For example, Patent document 1 discloses forming water-in-oil emulsion and a micron-size spherical silica particle that is obtained by hydrolysis and condensation polymerization between tetraalkoxysilane and water in a reaction field that is solubilization water contained in the water-in-oil emulsion.

For example, Patent document 2 discloses a method for manufacturing a hollow silica particle as a nanosize hollow silica particle, the method including preparing an organosol in which hollow silica fine particles are dispersed, adding a silane compound and an alkali catalyst to the organosol in a temperature range of from 30° C. to 300° C., and causing the silane compound to react with the hollow silica fine particles under a condition that the ratio of a water content to a silica content is from 0.1 to 50 weight %. Also disclosed is a hollow silica fine particle in which the average particle size as measured by a dynamic light scattering method is from 5 to 300 nm, the specific surface area is from 50 to 1,500 m²/g, a cavity is formed inside an outer shell, and a weight reduction of 1.0 wt % or more is caused in a temperature range of from 200° C. to 500° C. by thermogravimetry (TG).

Patent document 3 discloses a method for manufacturing a silica-based hollow particle, the method including coating a polystyrene particle as a core with alkoxysilane or the like and thermally decomposing the polystyrene particle. Also disclosed are silica-based hollow particles in which particles that have an aspect ratio of 1.5 or less account for 95% or more of all particles, the coefficient of variation of the particle size is from 20% to 60%, and the average particle size is from 30 to 150 nm.

Furthermore, Patent document 4 discloses a method for manufacturing an amorphous spherical silica hollow powder, the method including making a silica material powder spherical and hollow by supplying it to inside a high-temperature flame. Also disclosed is an amorphous spherical silica hollow powder in which the average particle size is from 0.5 to 8 μm, the average sphericity is 0.85 or more, the 50% burst pressure is 10 MPa or more, the average hollow ratio calculated from a density measured using a pycnometer method is from 20 to 70 volume %, and the maximum particle diameter is within 5 times the average particle diameter.

CITATION LIST

Patent Literature

Patent document 1: JP-A-H11-029318
Patent document 2: JP-A-2013-014506
Patent document 3: JP-A-2017-226567
Patent document 4: Japanese Patent No. 4,244,323

SUMMARY OF INVENTION

Technical Problem

The conventional hollow silica particles disclosed in Patent documents 1-4 may suffer a problem that they cannot be used in an intended manner because when silica particles are added to a solvent such as water the solvent permeates into the particles. For example, in the case where water enters hollow silica particles when they are added to water, the hollow silica particles are rendered semitransparent in the water to lose their light scattering ability or precipitate to lose their dispersibility.

The conventional hollow silica particle disclosed in Patent document 4 that is produced in a high-temperature flame is prone to break because of a thin shell and a negative pressure inside. For example, when hollow silica particles are added to resin or the like and they are kneaded together, hollow silica particles may break to lose spaces inside, as a result of which the hollow silica particles no longer exhibit required properties.

The present invention has been made in view of the above problems and an object of the invention is to provide a novel hollow silica particle in which a solvent such as water is not prone to permeate into the particle because it has a densified silica shell layer and which can lower the probability of occurrence of breaking or the like at the time of kneading because gas such as helium can pass through the shell and hence normal pressure can be kept inside.

Solution to Problem

The present invention relates to the following (1) to (9).
(1) A hollow silica particle including: a shell layer containing silica; and a space formed inside the shell layer,
in which the hollow silica particle has a particle density as measured by a dry pycnometer density measurement using helium gas of 2.00 g/cm³ or more and a particle density as measured by a dry pycnometer density measurement using oxygen gas of lower than 2.00 g/cm$^3$.

(2) The hollow silica particle according to (1), in which the particle density as measured by the dry pycnometer density measurement using helium gas is from 2.00 g/cm$^3$ to 2.40 g/cm$^3$.

(3) The hollow silica particle according to (1) or (2), in which the particle density as measured by the dry pycnometer density measurement using oxygen gas is from 0.40 g/cm$^3$ to 1.90 g/cm$^3$.

(4) The hollow silica particle according to any one of (1) to (3), in which the hollow silica particle has an average primary particle size of from 10 nm to 10 μm.

(5) The hollow silica particle according to any one of (1) to (4), in which the hollow silica particle has a BET specific surface area of from 5 m$^2$/g to 2,600 m$^2$/g.

(6) The hollow silica particle according to any one of (1) to (5), in which the hollow silica particle has a sphericity of from 0.8 to 1.0.

(7) The hollow silica particle according to any one of (1) to (6), in which the hollow silica particle has an oil absorption of from 30 mL/100 g to 1,000 mL/100 g.

(8) The hollow silica particle according to any one of (1) to (7), in which the hollow silica particle has an aggregation size (D50) of a secondary particle of from 0.1 μm to 50 μm.

(9) A method for manufacturing a hollow silica particle, the method including:
  obtaining a hollow silica precursor by forming a shell layer containing silica on an outer surface of a core;
  removing the core from the hollow silica precursor; and
  performing heat treatment at 700° C. or higher.

Advantageous Effects of Invention

The present invention can provide a hollow silica particle having a dense shell layer. The hollow silica particle according to the present invention can exhibit superior light scattering ability even in a solvent that has close refractive index because a solvent such as water, oil, or the like hardly permeates into the hollow silica particle. Furthermore, the hollow silica particle according to the present invention is superior in the dispersibility in a solvent.

DESCRIPTION OF EMBODIMENTS

Figure 1:
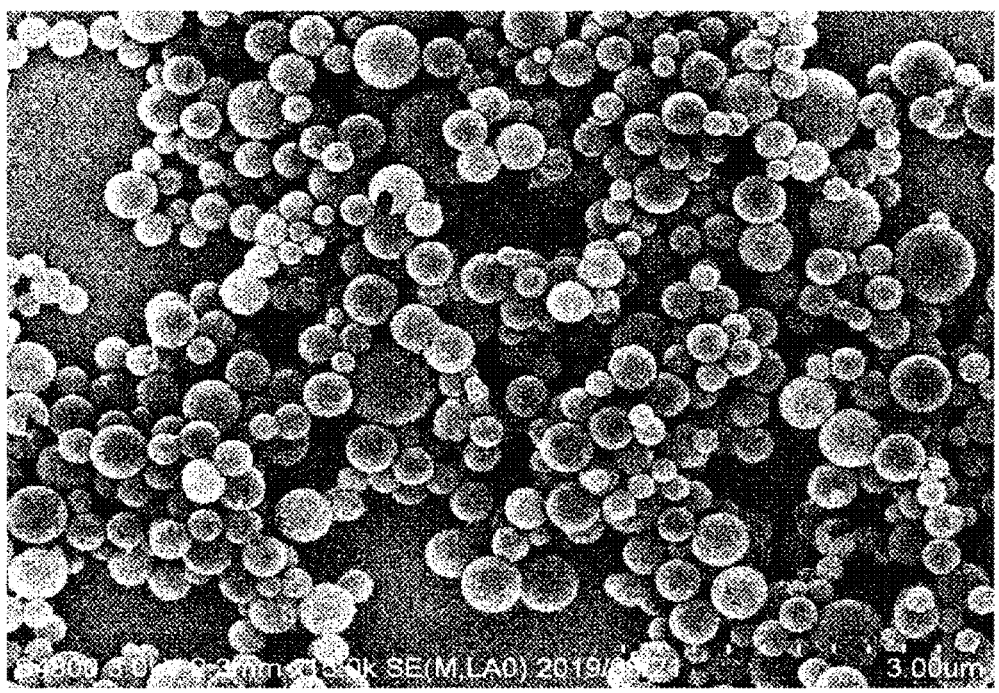
FIG. 1 shows a scanning electron microscope image (SEM image) of hollow silica particles obtained in Example 6.

Although the present invention will be described below, the invention is not limited by examples presented in the following description.

It is noted that in the present specification "mass" is the same in meaning as "weight."

(Hollow Silica Particle)

A hollow silica particle according to the present invention has a shell layer containing silica and a space formed inside the shell layer. The fact that the hollow silica particle has a space inside the shell layer can be confirmed by a transmission electron microscope (TEM) observation or a scanning electron microscope (SEM) observation. In the case of a SEM observation, the fact that the hollow silica particle is truly hollow can be confirmed by observing a damaged particle that is partially open. In the present specification, a spherical particle having a space inside the particle confirmed by a TEM observation or a SEM observation is defined as a "primary particle". Since the primary particles are partially bonded in the baking step or drying step, manufactured hollow silica is in the form of aggregated of secondary particles having the primary particles aggregated in many cases.

In the present specification, a shell layer "containing silica" means that it contains silica ($SiO_2$) at 50 mass % or more. The composition of a shell layer can be measured by ICP emission spectrometry, frame atomic absorption spectrometry, or the like. The silica contained in the shell layer is preferably 80 mass % or more, more preferably 95 mass % or more. The theoretical upper limit thereof is 100 mass %. The silica contained in the shell layer is preferably less than 100 mass %, more preferably 99.99 mass % or less. Examples of residual components include an alkali metal oxide, carbon, etc.

The expression "including a space formed inside a shell layer" means a hollow state that a single space is surrounded by the shell layer is found when a cross section of a single primary particle is observed. That is, a single hollow particle has one large space and a shell layer surrounding it.

The hollow silica particle according to the present invention has a particle density as measured by a dry pycnometer density measurement using helium gas (hereinafter referred to as a helium pycnometer method) of 2.00 g/cm$^3$ or more and a particle density as measured by a dry pycnometer density measurement using oxygen gas (hereinafter referred to as an oxygen pycnometer method) of lower than 2.00 g/cm$^3$. Since the hollow silica particle according to the present invention satisfies both relationships, it is understood that the particle is of a hollow shape having a shell layer with pores and that the shell layer is so dense that a solvent hardly permeates through it.

Whether the shell layer of the hollow silica particle has pores can be found by a dry pycnometer density measurement using helium gas. The silica true density is about 2.2 g/cm$^3$. Since the hollow silica particle has a space inside, its actual particle density is lower than the silica true density. However, the density of the hollow silica particle comes closer to the silica true density as a result of entrance of helium gas into the inside of the particle. The density of a hollow silica particle as measured by the helium pycnometer method being 2.00 g/cm³ or more means that helium gas has entered the inside of the particle and is stored in the inside space; it therefore becomes known that the shell layer has pores. Since the shell layer has pores, gas such as helium having a small molecular size can pass through the shell. As such, the hollow silica particle has normal pressure inside and hence the probability of occurrence of breaking or the like during kneading can be lowered.

It is preferable that the density of a hollow silica particle as measured by the helium pycnometer method be in a range of from 2.00 g/cm³ to 2.40 g/cm³. More specifically, the lower limit of the density is more preferably 2.05 g/cm³ or higher, further preferably 2.07 g/cm³ or higher, particularly preferably 2.09 g/cm³ or higher, and most preferably 2.10 g/cm³ or higher. The upper limit of the density is preferably 2.40 g/cm³ or lower, more preferably 2.30 g/cm³ or lower.

Whether a hollow silica particle is hollow can be found by a dry pycnometer density measurement using oxygen gas. Since oxygen gas has a larger molecular size than helium gas, in the case where the shell layer is dense, the oxygen gas cannot pass through the shell layer and hence an actual particle density can be measured. In the case where the density of the hollow silica particle as measured by the oxygen pycnometer method is lower than 2.00 g/cm³, it can be judged that a space exists inside the particle because the particle density is lower than the silica true density.

It is preferable that the density of a silica particle as measured by the oxygen pycnometer method be in a range of from 0.40 g/cm³ to 1.90 g/cm³. More specifically, the upper limit of the density is preferably 1.90 g/cm³ or lower, more preferably 1.80 g/cm³ or lower, further preferably 1.60 g/cm³ or lower, and particularly preferably 1.50 g/cm³ or lower, and most preferably 1.40 g/cm³ or lower. From the viewpoint of the strength of the shell of a hollow particle, the lower limit thereof is preferably 0.40 g/cm³ or higher, more preferably 0.50 g/cm³ or higher, further preferably 0.60 g/cm³ or higher, particularly preferably 0.70 g/cm³ or higher, and most preferably 0.80 g/cm³ or higher.

In the case where the particle density of hollow silica is higher than the density of water, its density can be measured using a specific gravity bottle and water. A sample (hollow silica particle) and water are put into a specific gravity bottle and a measurement is carried out after the specific gravity bottle was put in an airtight container made of PTFE (polytetrafluoroethylene resin) and has been left to stand for 16 hours in a constant temperature chamber kept at 110° C. It is preferable to carry out the above pretreatment because water permeation takes time depending on the density of the shell layer of hollow silica. In the case where a density measured after the pretreatment is 2.00 g/cm³ or more, it is considered that water permeation has occurred. In the case where a density measured after the pretreatment is lower than 2.00 g/cm³, it is considered that water permeation has not occurred and a hollow portion is maintained. A measurement result of this method corresponds to a result of a dry pycnometer density measurement using oxygen gas.

The particle density of a hollow silica primary particle according to the present invention can be adjusted by adjusting the ratio of the thickness of its shell (shell layer) to its particle diameter. In the case where the hollow silica primary particle is shaped like a true sphere, the following formulae hold:

volume of primary particle: $4\pi r^3/3$;

volume of space: $4\pi(r-d)^3/3$;

weight of primary particle: $4\pi\{r^3-(r-d)^3\}\rho/3$; and density of primary particle: $\{r^3-(r-d)^3\}\rho/r^3$, where r is the radius of the primary particle, d is the shell thickness, and ρ is the silica true density.

The ratio of the number of complete hollow particles whose shell layers are not damaged and that have a space inside to the number of sample hollow silica particles is referred to as a hollow particle ratio. Since the hollow silica particle according to the present invention has a dense shell layer, various solvents, argon gas, and gases having a larger dynamic molecular size than the oxygen molecule hardly permeate through it. However, in the case where there exist particles whose shell layers are damaged (damaged particles), they enter the insides of those particles. Thus, the particle density of secondary particles varies depending on their hollow particle ratio. The particle density of hollow silica secondary particles decreases as the hollow particle ratio becomes larger, and the particle density of hollow silica secondary particles increases as the hollow particle ratio becomes smaller. Based on this feature, with an assumption that the yield is 100%, a hollow particle ratio can be determined from a theoretical density determined from prepared amounts of raw materials and a density determined by the oxygen pycnometer method.

Additionally, the particle ratio can be estimated by determining a primary particle size and a shell thickness of a particle whose shell layer is not damaged using a SEM image or a TEM image. The hollow particle ratio can be determined from the particle density obtained from image information and the density determined by the oxygen pycnometer method.

The density that is measured by the oxygen pycnometer method or using a specific gravity bottle corresponds to an average particle density of secondary particles.

Furthermore, a hollow particle ratio can be determined from a weight change from a weight before heat treatment to a weight after it using a cake before oil core removal and after filtration. In the case where the cake after filtration is loosened and dried for one night, an oil component in damaged particles is evaporated whereas an oil component that in complete hollow particles is held therein. Since the weight change by heat treatment in a case that all of a prepared oil component (hollow particle ratio: 0%) has evaporated and that in a case that all of a prepared oil component is kept held (hollow particle ratio: 100%) can be calculated from prepared amounts of raw materials, the hollow particle ratio can be determined from a weight change that occurs when a sample that has been dried for one night after filtration is heat-treated to 800° C.

Adjustment as to whether hollow silica particles are to precipitate in a solvent, continue to be dispersed in it, or float at the top of it can be made by changing the primary particle density and/or the secondary particle density. To cause hollow silica particles to be dispersed in a solvent, it is desirable that the solvent density and the particle density be close to each other. For example, to cause hollow silica particles to be dispersed in water having a density of 1.0 g/cm³, it is desirable to adjust the particle density in a range of 0.8 g/cm³ or more to 1.2 g/cm³ or less.

A size of primary particles of hollow silica particles can be determined by observing their particle sizes (diameters) directly by SEM observation. More specifically, sizes of primary particles of 100 particles are measured from SEM images and a size distribution of the primary particles obtained by collecting them is estimated to be a size distribution of all the primary particles.

It is preferable that the average size of primary particles (average primary particle size) be in a range of from 10 nm to 10 μm. From the viewpoint of manufacture reproducibility, the lower limit thereof is preferably 20 nm or larger, more preferably 50 nm or larger, particularly preferably 70 nm, and most preferably 100 nm or larger. From the viewpoint of the ease of handling as a filler, the upper limit thereof is preferably 7 μm or smaller, more preferably 5 μm or smaller, particularly preferably 3 μm or smaller, and most preferably 1 μm or smaller.

It is preferable that the size (aggregation size (D50)) of secondary particles of hollow silica particles be from 0.1 μm to 50 μm.

From the viewpoint of the ease of handling, the aggregation size (D50) of secondary particles is more preferably 0.2 μm or larger, further preferably 0.3 μm or larger, particularly preferably 0.4 μm or larger, and most preferably 0.5 μm or larger. From the viewpoint of dispersibility when they are mixed with water, oil, fluororesin, or the like, the aggregation size (D50) of secondary particles is more preferably 35 μm or smaller, further preferably 30 μm or smaller, even further preferably 25 μm or smaller, still further preferably 15 μm or smaller, particularly preferably 10 μm or smaller, and most preferably 6 μm or smaller.

Examples of method for measuring an aggregation size (D50) of secondary particles include a method of measuring a median of a particle size distribution (diameter) twice by a diffractive scattering particle distribution measuring instrument and calculating their average value.

It is preferable that the hollow silica particle has the BET specific surface area of 5 m$^2$/g to 2,600 m$^2$/g.

Since the specific surface area decreases as the shell becomes denser, the BET specific surface area is preferably 2,000 m$^2$/g or smaller, more preferably 1,000 m$^2$/g or smaller, particularly preferably 500 m$^2$/g or smaller, and most preferably 300 m$^2$/g or smaller. The BET specific surface area is more preferably 8 m$^2$/g or larger, even more preferably 10 m$^2$/g or larger.

The value of the specific surface area value depends on the primary particle size and the shell (shell layer) thickness of hollow silica. In the case where a hollow silica primary particle is shaped like a true sphere and has a smooth surface, the following formulae hold:

weight of primary particle: $4\pi\{r^3-(r-d)^3\}\Sigma/3$;

surface area of primary particle: $4\pi r^2$; and specific surface area: $3r^2/\{r^3-(r-d)^3\}\rho$, where r is the radius of the primary particle, d is the shell thickness, and ρ is the silica true density.

Since it is preferable that the shell not have pores that allow permeation of oxygen, it is preferable that the specific surface area be close to the above theoretical value. The value of the BET specific surface area is preferably five times or smaller the above theoretical value, more preferably four times or smaller the above theoretical value, further preferably three times or smaller the above theoretical value, and most preferably two times or smaller the above theoretical value.

The BET specific surface area can be measured by a single-point method using a specific surface area analyzer (e.g., "Macsorb" produced by Mountech Co., Ltd.) and a mixed gas (absorption gas: nitrogen (30%), carrier gas: helium (70%)).

It is preferable that the sphericity of a hollow silica particle be in a range of from 0.8 to 1.0. The sphericity is expressed as a value that is obtained by measuring diameters (DL) of circumscribed circles of 100 arbitrary particles on a photo projection obtained by taking a photo with a scanning electron microscope (SEM) and diameters (DS) of their inscribed circles of the 100 arbitrary particles and calculating an average of respective ratios (DS/DL) of the diameters (DS) of the inscribed circles to the diameters (DL) of the circumscribed circles. From the viewpoints of light scattering ability, tactile impression, etc., the sphericity is more preferably 0.83 or larger, even more preferably 0.85 or larger, particularly preferably 0.87 or larger, and most preferably 0.9 or larger.

It is preferable that the shell thickness of a hollow silica particle be in a range of from 0.01 to 0.3 with respect to the diameter ("1") of a primary particle. In the case where the shell thickness is smaller than 0.01 with respect to the diameter ("1") of a primary particle, the hollow silica particle may be low in strength. In the case where this ratio is larger than 0.3, the hollow portion inside the particle is so small that properties originating from the hollow shape may be lost.

The shell thickness with respect to the diameter ("1") of a primary particle is more preferably 0.02 or larger, further preferably 0.03 or larger. The shell thickness is more preferably 0.2 or smaller, further preferably 0.1 or smaller.

The shell thickness is determined by measuring a shell thickness of each particle by a transmission electron microscope (TEM).

Having a hollow portion inside, the hollow silica particle can contain a substance inside the particle. Since the shell layer of the hollow silica particle according to the present invention is dense, various solvents hardly permeate through it. However, if damaged particles exist, a solvent enters the insides of those particles. Thus, the oil absorption varies depending on the proportion of damaged particles.

It is preferable that the oil absorption of hollow silica particles be from 30 mL/100 g to 1,000 mL/100 g.

Since the viscosity becomes high in the case where the oil absorption is too large, the oil absorption is more preferably 900 mL/100 g or smaller, further preferably 850 mL/100 g or smaller, particularly preferably 830 mL/100 g or smaller, and most preferably 800 mL/100 g or smaller. Since a small oil absorption means that a powder is hardly wetted by oil, the oil absorption is more preferably 35 mL/100 g or larger, further preferably 40 mL/100 g or larger, particularly preferably 45 mL/100 g or larger, and most preferably 50 mL/100 g or larger.

Because of the above-mentioned relationship between the proportion of damaged particles and the oil absorption, the oil absorption can be adjusted by adjusting the proportion of damaged particles. Furthermore, spaces between primary particles are also spaces capable of holding oil, it is considered that the oil absorption increases as the aggregation diameter of secondary particles increases and the oil absorption decreases as the aggregation diameter of secondary particles decreases.

An oil absorption can be measured according to JIS K 5101-13-1 (established in year 2004).

The fact that the hollow silica particle according to the present invention is a particle having a dense shell layer can also be confirmed by a dispersion-in-water test. More specifically, a state obtained after adding hollow silica particles at 1 mass % in pure water of 5 mL, dispersing the hollow silica particles by applying ultrasonic waves for 30 seconds, and leaving to stand for one week is observed. The hollow silica particles after leaving to stand for one week are dispersed again and observed visually in comparison with the sample immediately after the dispersion. In the case where a white color is maintained, it can be judged that water has not permeated into the insides of the particles. In the case where water permeates into the insides of the particles, the water turns semitransparent or transparent.

The fact that the hollow silica particle according to the present invention is a particle having a dense shell layer can also be confirmed by a redispersion test. More specifically, redispersibility is checked after adding hollow silica particles at 1 mass % in pure water of 5 mL, dispersing the hollow silica particles by applying ultrasonic waves for 30 seconds, and leaving to stand for one week. A sample bin containing the dispersion that has been left to stand is closed by a lid firmly and rotated upside down slowly two times. In the case where no cake of particles has precipitated to the bottom, it can be judged that water has not permeated. In the case where water permeates into the insides of the particles, the apparent density increases, and when the particles have precipitated, they form a hard cake to make redispersion difficult.

The fact that the hollow silica particle according to the present invention is a particle having a dense shell layer can also be confirmed by checking a pore size peak that is measured by a nitrogen absorption method. For example, pore size can be checked by a measurement using a pore distribution measuring instrument produced by Micromeritics Instruments Corporation. In the case where pores through which nitrogen gas can permeate exist in shells, pore size peak can be found in a 2 nm to 15 nm range. On the other hand, in the case where pore size is so small that nitrogen gas cannot permeate through it, pore size peak can no longer be found and hence it is confirmed that the hollow silica particles have dense shell layers.

In the present invention, it is preferable that the shell layer of the hollow silica particle contain an alkali metal component. In the case where the content of an alkali metal component is low, the shell becomes porous, that is, it becomes difficult to obtain a shell that is dense and high in strength. Almost no such alkali metal component is found in the case where silicon alkoxide is used as a silica material.

In the case where, for example, a sodium silicate aqueous solution is used as a silica material, the mass concentration of an Na component in the shell of the hollow silica particle obtained is preferably 200 mass ppm or higher, more preferably 300 mass ppm or higher, further preferably 500 mass ppm or higher, particularly preferably 800 mass ppm or higher, and most preferably 1,000 mass ppm or higher. On the other hand, the mass concentration of an Na component in the shell of a common hollow silica particle manufactured using tetraethyl orthosilicate as a silica material is 100 mass ppm or lower.

The content of a Ca component is preferably 10 mass ppm or higher, more preferably 30 mass ppm or higher, and further preferably 50 mass ppm or higher. The content of an Mg component is preferably 5 mass ppm or higher, more preferably 10 mass ppm or higher, and further preferably 50 mass ppm or higher. However, in the case where the content of an alkali metal or an alkaline earth metal is too high, when hollow silica is dispersed in water or the like, it is eluted to cause a dispersion to turn alkaline or impair the function of a surfactant; from the viewpoint of the stability of a mixed component, it is preferable that the content of an alkali metal or an alkaline earth metal be a prescribed value or lower. In the case where a member mixed with hollow silica containing an alkali metal or an alkaline earth metal at a high content is used for an electronic use, ion migration may occur. Thus, it is preferable that the content of an Na component be 1,500 mass ppm or lower. The content of a Ca component is preferably 1,000 mass ppm or lower, more preferably 800 mass ppm or lower, and further preferably 500 mass ppm or lower. The content of an Mg component is preferably 500 mass ppm or lower, more preferably 300 mass ppm or lower, and further preferably 100 mass ppm or lower.

The content of alkali metal or alkaline earth metal can be measured by ICP emission spectrometry after removing silicon which is a main component by adding perchloric acid and hydrofluoric acid to hollow silica obtained and heating strongly.

In the case where an alkali metal silicate is used as a silica material, the content of a carbon component originating from raw material in hollow silica particles obtained is smaller than in a case of using silicon alkoxide as a silica material.

Hollow silica particles are expected to be used in a state that they are dispersed in resin, a solvent, water or the like, and hence it is preferable that they not precipitate but be kept dispersed. Dispersion stability can be evaluated by the following method. That is, dispersion stability can be evaluated by preparing a water dispersion in which the concentration of hollow silica particles is 250 mass ppm, dispersing it by applying ultrasonic waves for 30 seconds and then observing a temporal change of absorbance at a wavelength of 310 nm using a spectrophotometer ("UV-1280" produced by Shimadzu Corporation). When immediately after preparation of aqueous dispersion is set to 0 hour and the absorbance at 0 hour is set to 1, dispersion stability is evaluated using absorbance ratios measured at 25° C. when 1 hour, 2 hours, and 15 hours elapsed. Water permeates into the insides of open particles or hollow silica particles having a water-permeable shell after a lapse of a prescribed time. The absorbance lowers by an amount corresponding to the degree of precipitation that occurs because the apparent specific gravities of particles come closer to the silica true density due to permeation of water. The absorbance ratio measured after a lapse of 1 hour is preferably 0.2 or larger, more preferably 0.5 or larger, further preferably 0.6 or larger, particularly preferably 0.8 or larger, and most preferably 0.9 or larger. Since the absorbance is constant if the dispersion stability is ideal, the maximum value of the absorbance ratio is considered to be 1.0 or smaller. The absorbance decreases after a lapse of 2 hours because the hollow silica particles gradually precipitate or float according to their apparent specific gravities. The absorbance ratio measured after a lapse of 15 hours is preferably 0.2 or larger, more preferably 0.3 or larger, further preferably 0.6 or larger, particularly preferably 0.7 or larger, and most preferably 0.8 or larger.

Titanium oxide and zinc oxide which are inorganic materials used for white pigments have a reflectance peak around a wavelength of 400 nm and hence look bluish white. A degree of whiteness can be evaluated from a reflectance and spectral colors using an optical layer which is formed by applying a mixture of inorganic particles and a fluororesin and coated on a glass sheet. In particular, a reflectance can be measured using a spectrophotometer.

In the hollow silica particle according to the present invention, the ratio of a reflectance at a wavelength of 400 nm to that at a wavelength of 800 nm is preferably 2.00 or smaller, more preferably 1.50 or smaller, further preferably 1.35 or smaller, particularly preferably 1.20 or smaller, and most preferably 1.10 or smaller. Since hollow silica particles look reddish in the case where the ratio of a reflectance at a wavelength of 400 nm to that at a wavelength of 800 nm is too small, the reflectance ratio is preferably 0.5 or larger, more preferably 0.8 or larger, and further preferably 0.9 or larger.

An L* value representing a brightness and a b* value representing chromaticity can be measured using a spectrocolorimeter. The L* value of the hollow silica particle according to the present invention is preferably 30.0 or larger, more preferably 40.0 or larger, further preferably 45.0 or larger, and particularly preferably 50.0 or larger. Since the L* value is equal to 100 in the case of ideal perfect diffuse reflection, the L* value is 100 or smaller. The b* value of the hollow silica particle is preferably −5.0 or larger, more preferably −4.5 or larger, further preferably −4.0 or larger, particularly preferably −3.5 or larger, and most preferably −3 or larger. The b* value is preferably +5.0 or smaller, more preferably +4.5 or smaller, further preferably +4.0 or smaller, particularly preferably +3.5 or smaller, and most preferably +3 or smaller.

Strength of the hollow silica particles can be evaluated on the basis of a ratio of particles that are damaged when a hydrostatic pressure at a prescribed pressure is applied to the hollow silica particles after they are enclosed in a sealer bag and sealed. A larger pressure that is necessary to damage a prescribed proportion of hollow silica particles means that the hollow silica particles can withstand a larger pressure. A pressure at which the proportion of particles that are damaged by hydrostatic pressure treatment is equal to 10% is preferably 1 MPa or larger, more preferably 5 MPa or larger, further preferably 10 MPa or larger, particularly preferably 20 MPa or larger, and most preferably 30 MPa or larger. Although there are no limitations on the upper limit of this pressure, it is preferable that this pressure be 1 GPa or smaller.

An amount of silanol (Si—OH) on the surface of a hollow silica particle is obtained by an IR measurement. More specifically, evaluation can be made by determining an Si—OH/Si—O—Si peak intensity ratio after an IR spectrum is normalized by a value at 800 cm$^{-1}$ and baseline adjustment is made at 3,800 cm$^{-1}$. In the case where the amount of surface silanol is large, the dielectric loss becomes large when a member produced by mixing hollow silica particles with resin is used for an electronic use. The Si—OH/Si—O—Si peak intensity ratio is preferably 0.50 or smaller, more preferably 0.30 or smaller, further preferably 0.20 or smaller, particularly preferably 0.15 or smaller, and most preferably 0.10 or smaller. In general, amorphous silica contains silanol at a large proportion. Since it is considered that amorphous silica comes closer to crystalline silica if the proportion of silanol is too small, it is preferable that the Si—OH/Si—O—Si peak intensity ratio be 0.01 or larger.

A water vapor absorption amount of hollow silica particles can be determined by using an instrument capable of checking a gas absorption amount with water vapor as a gas. A large water vapor absorption amount means that the number of portions (absorption sites) capable of absorbing water vapor is large, and hence is not preferable for electronic member uses. The maximum water vapor absorption amount is preferably 5.0 (cm$^3$/gSTP)/(m$^2$/g) or smaller, more preferably 4.0 (cm$^3$/gSTP)/(m$^2$/g) or smaller, further preferably 3.0 (cm$^3$/gSTP)/(m$^2$/g) or smaller, particularly preferably 2.0 (cm$^3$/gSTP)/(m$^2$/g) or smaller, and most preferably 1.0 (cm$^3$/gSTP)/(m$^2$/g) or smaller. An example portion capable of absorbing water vapor is silanol. Since it is considered that amorphous silica comes closer to crystalline silica if the number of portions capable of absorbing water vapor is too small, it is preferable that the maximum water vapor absorption amount be 0.1 (cm$^3$/gSTP)/(m$^2$/g) or larger.

Hollow silica particles can scatter light in a broad range from ultraviolet ray to near infrared ray to all directions according to their concentration without absorbing it. Furthermore, hollow silica particles exhibit no photocatalytic property unlike white pigments such as titanium oxide and can be used as a safe white pigment made of amorphous silica.

A white film that exhibits high weatherability can be obtained by mixing hollow silica particles with fluororesin which has features of high resistance to ultraviolet ray and high ultraviolet transmittance. Such a white film is suitable for use in film structures (e.g., natural grass stadium and agricultural house) that enable growth of plants that require ultraviolet ray for growth. Furthermore, such a white film is expected to provide an effect of sterilization inside a film structure because it can transmit ultraviolet ray as scattered light to a proper degree while preventing direct incidence of sunlight. In addition, since such a white film reflects or transmits most of sunlight, the film itself does not absorb energy and hence the temperature of the film itself is not prone to increase.

The weatherability of a fluororesin film in which hollow silica particles are mixed can be evaluated by observing changes of haze, total light transmittance, and parallel light transmittance every elapsed time using an accelerated weathering test instrument. Since the weatherability is higher as haze variations are smaller, the haze obtained after a lapse of 1,016 hours in a weatherability test with respect to initial haze is preferably 1.50 or smaller, more preferably 1.20 or smaller, further preferably 1.10 or smaller, and particularly preferably 1.05 or smaller. Since the haze tends to increase as a fluororesin in which hollow silica is mixed deteriorates, as for the lower limit of the haze should be 1.00 or larger.

The hollow silica particle according to the present invention has a dense shell. Thus, even if hollow silica particles are mixed with resin, no resin goes into the insides of the hollow silica particles and hence empty space layers can be maintained. Since the hollow silica particles according to the present invention form secondary particles, empty spaces exist also between primary particles. Since air is a substance that is small in thermal conductivity, resin that is given air layers by addition of hollow silica particles according to the present invention would be decreased in thermal conductivity and hence increased in heat insulation performance. For example, a resin film and a resin sheet that are lightweight and superior in heat insulation performance can be manufactured. Furthermore, by using hollow silica particles in such a manner that they are mixed in coating material, they can serve as part of a heat insulation coating material that can be coated afterward to a house or a window glass.

When hollow silica particles are added to non-porous bulk resin by 20 vol %, the thermal conductivity is preferably lower by 5% or more than in a case of the resin itself, more preferably 10% or more and most preferably 15% or more. Increase in thermal conductivity caused by addition of hollow silica particles means decrease in heat insulation performance. It is therefore preferable that a change rate of thermal conductivity in the increasing direction be 1% or less.

(Method for Manufacturing Hollow Silica Particle)

The method for manufacturing a hollow silica particle according to the present invention includes obtaining a hollow silica precursor by forming a shell layer containing silica on the outer surface of a core; removing the core from the hollow silica precursor; and performing heat treatment at 700° C. or higher.

A more specific method for manufacturing a hollow silica particle according to the present invention uses oil-in-water emulsion containing an aqueous phase, an oil phase, and a surfactant. A hollow silica precursor is obtained in which a shell layer containing silica is formed on the outer surface of a core in the emulsion. The hollow silica particle is obtained by removing the core from the precursor and then performing heat treatment. This oil-in-water emulsion is emulsion in which oil phase is dispersed in water. When a silica material is added to this emulsion, the silica material is deposited on the oil droplets, oil core-silica shell particles thereby can be formed.

The above-described method for manufacturing a hollow silica particle includes a step of forming a first-stage shell by adding a first silica material to oil-in-water emulsion that contains an aqueous phase, an oil phase, and a surfactant; a step of forming a second-stage shell and obtaining a hollow silica precursor by adding a second silica material to the emulsion in which the first-stage shell is formed; and a step of obtaining a hollow silica particle from the hollow silica precursor.

In the following, the oil-in-water emulsion may sometimes be referred to simply as an "emulsion." Furthermore, a dispersion having oil core-silica shell particles dispersed, formed by adding the first silica material and not having the second silica material added yet, and a dispersion having oil core-silica shell particles dispersed and having the second silica material added may also be sometimes referred to simply as an "emulsion". The latter dispersion having oil core-silica shell particles dispersed and having the second silica material added may be equivalent to the hollow silica precursor dispersion.

<First-Stage Shell Forming Step>

First, a first-stage shell is formed by adding a first silica material to oil-in-water emulsion that contains an aqueous phase, oil phases, and a surfactant.

The aqueous phase of the emulsion mainly contains water as a solvent. The aqueous phase may further contain a water-soluble organic liquid, or an additive such as a water-soluble resin. It is preferable that the proportion of the water in the aqueous phase be from 50 mass % to 100 mass %, more preferably from 90 mass % to 100 mass %.

It is preferable that the oil phases of the emulsion contain a non-water-soluble organic liquid that is incompatible with the aqueous phase component. This organic liquid forms droplets in the emulsion to thereby form an oil-core portion of the hollow silica precursor.

Examples of the organic liquid include aliphatic hydrocarbons such as n-hexane, isohexane, n-heptane, isoheptane, n-octane, isooctane, n-nonane, isononane, n-pentane, isopentane, n-decane, isodecane, n-dodecane, isododecane, and pentadecane, and paraffin base oil which is a mixture thereof; alicyclic hydrocarbons such as cyclopentane, cyclohexane, and cyclohexene and naphthenic base oil which is a mixture thereof; aromatic hydrocarbons such as benzene, toluene, xylene, ethylbenzene, propylbenzene, cumene, mesitylene, tetralin, and styrene; ethers such as propyl ether, isopropyl ether; esters such as ethyl acetate, n-propyl acetate, isopropyl acetate, n-butyl acetate, isobutyl acetate, n-amyl acetate, isoamyl acetate, butyl lactate, methyl propionate, ethyl propionate, butyl propionate, methyl butyrate, ethyl butyrate, and butyl butyrate; vegetable oils such as palm oil, soybean oil, and rapeseed oil; and fluorinated solvents such as hydrofluorocarbon, perfluorocarbon, and perfluoropolyether. Polyoxy alkylene glycol which is a hydrophobic liquid at the shell-forming reaction temperature may also be used. For example, polypropylene glycol (molecular weight: at least 1,000) or a polyoxyethylene-polyoxypropylene block copolymer in which the proportion of oxyethylene units is smaller than 20 mass % and the cloudy point (1 mass % aqueous solution) is 40° C. or lower, preferably 20° C. or lower. Among them, a polyoxy propylene-polyoxyethylene-polyoxypropylene-type block copolymer is used preferably.

They may be used alone or in combination of two or more so long as a single oil phase is formed.

Preferable organic liquids are hydrocarbons that are 8 to 16, in particular, 9 to 12, in the number of carbons. The organic liquid is selected comprehensively considering workability, the safety against fire, the separation property between hollow silica precursors and the organic liquid, the shape of hollow silica particles, the solubility of the organic liquid in water, and so on. Hydrocarbons that are from 8 to 16 in the number of carbons may be linear, branched, and cyclic hydrocarbons so long as it is chemically stable, or may be a mixture of hydrocarbons differing in the number of carbons. It is preferable that such hydrocarbons be saturated one, more preferably linear saturated one.

The flash point of the organic liquid is preferably from 20° C. to 90° C., more preferably from 30° C. to 80° C. In the case where an organic liquid that has the flash point of lower than 20° C. is used, since the flash point is too low, countermeasures in the working environment are required for fire control.

The emulsion contains a surfactant to improve the emulsification stability. It is preferable that the surfactant be water-soluble or water-dispersible and be used being added to an aqueous phase. It is preferable that the surfactant be a nonionic surfactant.

Examples of nonionic surfactants include the following surfactants:

polyoxyethylene-polyoxypropylene copolymer-type surfactants;

polyoxyethylene sorbitan fatty acid ester-type surfactants: polyoxyethylene sorbitan monolaurate, polyoxyethylene sorbitan monopalmitate, polyoxyethylene sorbitan monostearate, polyoxyethylene sorbitan tristearate, and polyoxyethylene sorbitan monooleate;

polyoxyethylene higher alcohol ether-type surfactants: polyoxyethylene lauryl ether, polyoxyethylene cetyl ether, polyoxyethylene stearyl ether, polyoxyethylene oleyl ether, polyoxyethylene octyl phenol ether, and polyoxyethylene nonylphenol ether;

polyoxyethylene aliphatic ester-type surfactants: polyoxyethylene glycol monolaurate, polyoxyethylene glycol monostearate, and polyoxyethylene glycol monooleate; and glycerin fatty acid ester-type surfactants: monoglyceryl stearate and monoglyceryl oleate.

Furthermore, a polyoxyethylene sorbitol fatty acid ester-type surfactant, a sucrose fatty acid ester-type surfactant, a polyglycerin fatty acid ester-type surfactant, a polyoxyethylene hydrogenated castor oil-type surfactant, etc. may also be used.

They may be used alone or in combination of two or more kinds.

Among the above-mentioned nonionic surfactants, the polyoxyethylene-polyoxypropylene copolymer-type surfactant is used preferably. The polyoxyethylene-polyoxypropylene copolymer is a block copolymer obtained by bonding a polyoxyethylene block (EO) and a polyoxypropylene block (PO). Examples of block copolymer include an EO-PO-EO block copolymer and an EO-PO block copolymer, and the EO-PO-EO block copolymer is preferable. The proportion of oxy ethylene units in the EO-PO-EO block copolymer is preferably 20 mass % or larger, more preferably 30 mass % or larger.

The weight average molecular weight of the polyoxyethylene-polyoxypropylene copolymer is preferably from 3,000 to 27,000, more preferably from 6,000 to 19,000.

The total amount of polyoxyethylene blocks to the entire polyoxyethylene-polyoxypropylene copolymer is preferably from 40 mass % to 90 mass % and the total amount of polyoxypropylene blocks to the entire polyoxyethylene-polyoxypropylene copolymer is preferably from 10 mass % to 60 mass %.

The amount of the surfactant used varies depending on the conditions such as the type of surfactant, HLB (hydrophile-lipophile balance) which is an index indicating the degree of hydrophilicity or hydrophobicity of the surfactant, the particle size of the silica particle desired. The content thereof in an aqueous phase is preferably from 500 mass ppm to 20,000 mass ppm, more preferably from 1,000 mass ppm to 10,000 mass ppm. The emulsion can be made more stable in the case where its content is 500 mass ppm or higher. The amount of a surfactant remaining in the hollow silica particle product can be made small in the case where its content is 20,000 mass ppm or lower.

The aqueous phase and the oil phase may be blended in a mass ratio of from 200:1 to 5:1, preferably from 100:1 to 9:1.

The method for preparing oil-in-water emulsion is not limited to the following methods. The aqueous phase and the oil phase are preliminary prepared, and the oil phase is added to the aqueous phase, followed by sufficient mixing or stirring, whereby the oil-in-water emulsion can be prepared. Methods such as ultrasonic emulsification of physically applying a strong shearing force, emulsification by stirring, high-pressure emulsification or the like may be employed. Further, membrane emulsification of forcing the oil phase through a membrane having fine pores to form fine droplets of the oil phase, which are dispersed in the aqueous phase, a phase inversion emulsification method of dissolving the surfactant in the oil phase and then adding the aqueous phase and conducting emulsification, or a phase inversion temperature emulsification method of utilizing a phenomenon that the surfactant changes from water-soluble to oil-soluble at a temperature around a cloudy point may, for example, be mentioned. The emulsification method may be properly selected depending upon properties such as desired particle size, particle size distribution, etc.

To decrease the particle size of the obtainable hollow silica particles and to narrow the particle size distribution, it is preferable that the oil phase is sufficiently dispersed in the aqueous phase and the mixed liquid is emulsified. For example, the mixed liquid can be emulsified using a high-pressure homogenizer at a pressure of 100 bar or higher, preferably of 400 bar or higher.

In the first-stage shell forming step, a first silica material is added to oil-in-water emulsion.

Examples of first silica material include an aqueous solution in which water-soluble silica is dissolved, an aqueous dispersion in which solid silica is dispersed, and a mixture thereof and one or more kinds selected from the group consisting of an alkali metal silicate, activated silicic acid, and a silicon alkoxide, aqueous solutions thereof, and aqueous dispersions thereof. Among these examples, one or more kinds selected from the group consisting of an alkali metal silicate, activated silicic acid, and a silicon alkoxide, aqueous solutions thereof, and aqueous dispersions thereof are preferable in view of availability.

Examples of solid silica include silica sol obtained by hydrolyzing an organic silicon compound and commercially available silica sol.

Examples of alkali metal in alkali metal silicate include lithium, sodium, potassium, and rubidium, and among them, sodium is preferable in view of availability and the cost. That is, sodium silicate is a preferable example of alkali metal silicate. Sodium silicate has a composition that is expressed as $Na_2O \cdot nSiO_2 \cdot mH_2O$. It is preferable that the silicate-to-sodium ratio be from 1.0 to 4.0 in terms of $SiO_2/Na_2O$ molar ratio, more preferably from 2.0 to 3.5.

The activated silicic acid is one obtained by subjecting an alkali metal silicate to cation exchange to replace the alkali metal with hydrogen, and an activated silicic acid aqueous solution is weakly acidic. A hydrogen cation exchange resin can be used for the cation exchange.

It is preferable to add the alkali metal silicate and activated silicic acid to emulsion after they are dissolved or dispersed in water. It is preferable that the concentration of an alkali metal silicate aqueous solution and an activated silicic acid aqueous solution be from 3 mass % to 30 mass % in terms of an $SiO_2$ concentration, more preferably from 5 mass % to 25 mass %.

Preferable examples of silicon alkoxide are tetraalkylsilanes such as tetramethoxysilane, tetraethoxysilane, and tetrapropoxysilane.

Furthermore, it is possible to obtain composite particles by mixing other metal oxide or the like with the silica material. Examples of the other metal oxide include titanium dioxide, zinc oxide, cerium oxide, copper oxide, iron oxide, and tin oxide.

Either one kind or a mixture of two or more kinds of the above-mentioned silica materials may be used as the first silica material. Among the above-mentioned examples, it is preferable to use an alkali metal silicate aqueous solution, in particular, a sodium silicate aqueous solution.

It is preferable to add the first silica material to the oil-in-water emulsion under an acidic condition. A first-stage coating is formed by producing silica fine particles and forming a network thereof by adding the silica material under an acidic condition.

To keep the emulsion stable, the reaction temperature is preferably 80° C. or lower, more preferably 70° C. or lower, further preferably 60° C. or lower, particularly preferably 50° C. or lower, and most preferably 40° C. or lower. From the viewpoint of controlling the rate of formation of the network of silica fine particles so as to make the thickness of the coating uniform, the reaction temperature is preferably 4° C. or higher, more preferably 10° C. or higher, further preferably 15° C. or higher, particularly preferably 20° C. or higher, and most preferably 25° C. or higher.

From the viewpoints of making the thickness of the coating uniform and making the silica shell layer of hollow silica to be obtained denser, the pH of the oil-in-water emulsion during reaction is more preferably 3.0 or smaller, further preferably 2.4 or smaller, and is more preferably 1.0 or larger.

One method for making the oil-in-water emulsion acidic is to add an acid.

Examples of acid include hydrochloric acid, nitric acid, sulfuric acid, acetic acid, perchloric acid, hydrobromic acid, trichloroacetic acid, dichloroacetic acid, methanesulfonic acid, and benzenesulfonic acid.

It is preferable to add the first silica material by such an amount that the proportion of $SiO_2$ in the first silica material becomes from 1 parts by mass to 50 parts by mass with respect to the amount of the oil phase of 100 parts by mass contained in the emulsion, more preferably from 3 parts by mass to 30 parts by mass.

As for the manner of addition of the first silica material, it is preferable to hold, for one minute or longer, a state that the emulsion is kept acidic, more preferably 5 minutes or longer, and further preferably 10 minutes or longer, after the addition of the first silica material.

It is preferable to thereafter keep the pH of the emulsion having the first silica material added 5 or larger and 7 or smaller. This makes it possible to fix the first silica material on the surface of oil droplets.

An example method for making the pH of the emulsion 5 or larger is to add a base to the emulsion having the first silica material added.

Examples of the base include alkali metal hydroxides such as sodium hydroxide and potassium hydroxide, alkaline earth metal hydroxides such as magnesium hydroxide and calcium hydroxide, ammonia, and amines.

Alternatively, a method of replacing anions such as halogen ions with hydroxide ions by anion exchange treatment may be employed.

In adding the base, it is preferable to increase the pH of the emulsion gradually by adding the base gradually while stirring emulsion having the first silica material added. In the case where the stirring is weak or the base is input in a large amount at one time, the pH of the emulsion may become ununiform to make the thickness of the first layer coating ununiform.

It is preferable to hold the emulsion while stirring it. The holding time may be 10 minutes or longer and is preferably 1 hour or longer, and the holding time of 4 hours or longer is allowable. To maintain the emulsion stable, the holding temperature is preferably 100° C. or lower, more preferably 95° C. or lower, further preferably 90° C. or lower, and particularly preferably 85° C. or lower. To accelerate maturation, the holding temperature is preferably 35° C. or higher, more preferably 40° C. or higher, and particularly preferably 45° C. or higher.

<Second-Stage Shell Forming Step>

Subsequently, a second silica material is added to the emulsion under the presence of alkali metal ions, whereby a hollow silica precursor dispersion is obtained. The hollow silica precursors are oil core-silica shell particles.

It is preferable to add the second silica material to the emulsion under an alkaline condition.

In adding the first silica material, the method of making the emulsion acidic temporarily and then making its pH 5 or larger is employed to make the first silica material to be deposited on the oil droplets more uniformly. The first-layer silica layer that is obtained by this method are porous and insufficient in denseness and hence it is low in strength. The high-density second-layer silica layer can be formed on the first-layer silica layer that were obtained before by making the emulsion alkaline in adding the second silica material.

To suppress production of new fine particles, the pH of the emulsion at the time of addition of the second silica material is preferably 8 or larger, more preferably 8.5 or larger, further preferably 8.7 or larger, particularly preferably 8.9 or larger, and most preferably 9 or larger. Since the solubility of silica becomes large in the case where the pH is too large, the pH of the emulsion is preferably 13 or smaller, more preferably 12.5 or smaller, further preferably 12 or smaller, particularly preferably 11.5 or smaller, and most preferably 11 or smaller.

One method for making the oil-in-water emulsion alkaline is to add a base. Example bases are the same compounds as mentioned above.

Either a single kind, or a mixture of two or more kinds of second silica material that is the same as the above-described first silica material may be used. Among such example second silica materials, at least one of a sodium silicate aqueous solution and an activated silicic acid aqueous solution is used preferably to add the second silica material.

To add the second silica material to the emulsion under the alkaline condition, a method of adding the alkali metal hydroxide at the same time as the second silica material may be employed. Alternatively, a method of using sodium silicate which is the alkali metal silicate as the second silica material may be employed. In this case, since a sodium silicate component which is an alkali component is added to weakly acidic emulsion whose pH was made 5 or larger after the addition of the first silica material, the emulsion can be kept alkaline while the second silica material is added. Furthermore, alkali metal ions come to exist in the emulsion.

In addition, in the case where the pH becomes too large when, for example, a sodium silicate aqueous solution is used as the second silica material, an acid may be added to adjust the pH. The acid that is used in this case may be the same acid as was used to add the first silica material.

It is preferable to add the second silica material under the presence of alkali metal ions. The alkali metal ions used here may be ones that originate from the first silica material, the second silica material, or the base that was added for pH adjustment, or can be mixed by, for example, adding an additive to the emulsion. For example, this situation occurs in the case where an alkali metal silicate is used as at least one of the first silica material and the second silica material or the case where an alkali metal halide, a sulfate salt, a nitrate salt, a fatty acid salt, or the like is used as an additive to the emulsion.

For example, the second silica material may be added in such a manner that one or both of a sodium silicate aqueous solution and an activated silicic acid aqueous solution to the emulsion having the first silica material added. In the case where both of a sodium silicate aqueous solution and an activated silicic acid aqueous solution are added, they may be added either together or in order.

To accelerate depositing the silica material on the first-layer silica layer while making pH adjustment, the second silica material may be added by, for example, executing a step of adding a sodium silicate aqueous solution and a step of adding an activated silicic acid aqueous solution two or more times in succession.

To accelerate depositing the silica material on the first-layer silica layer, it is preferable to add the second silica material to heated emulsion. To suppress production of new fine particles, the heating temperature is preferably 30° C. or higher, more preferably 35° C. or higher, further preferably 40° C. or higher, particularly preferably 45° C. or higher, and most preferably 50° C. or higher. Since the solubility of silica increases in the case where the temperature increases, the heating temperature is preferably 100° C. or lower, more preferably 95° C. or lower, further preferably 90° C. or lower, particularly preferably 85° C. or lower, and most preferably 80° C. or lower. In the case where heated emulsion is used, it is preferable to cool the produced emulsion to room temperature (23° C.) gradually after the addition of the second silica material.

In adding the second silica material, it is preferable that the addition amount of the second silica material be adjusted so that the proportion of $SiO_2$ in the second silica material be from 20 parts by mass to 500 parts by mass, more preferably from 40 parts by mass to 300 parts by mass, with respect to the amount of the oil phase of 100 parts by mass.

It is preferable that the emulsion as added with the second silica material be held for 10 minutes or longer in a state that it is kept alkaline.

As a result of the addition of the first silica material and the second silica material, it is preferable that the total addition amount of the first silica material and the second silica material be adjusted so that the total proportion of $SiO_2$ of the first silica material and $SiO_2$ of the second silica material becomes from 30 parts by mass to 500 parts by mass, more preferably from 50 parts by mass to 300 parts by mass, with respect to the amount of the oil phase of 100 parts by mass.

The silica shell layer according to the present invention, which mainly contain silica, may contain other metal component such as Ti or Zr if necessary, for example, for refractive index adjustment. Although there are no particular limitations on the method for having other metal component be contained, for example, the method in which a metal sol liquid or a metal salt aqueous solution is added at the same time in a step of adding a silica material is used.

The hollow silica precursor dispersion is obtained in the above-described manner.

Examples of method for obtaining hollow silica precursors from the hollow silica precursor dispersion include a method of filtering the dispersion, a method of removing the aqueous phase by heating, and a method of separating precursors by sedimentation separation or centrifugal separation.

A specific example is a method of filtering the dispersion using a filter of about from 0.1 μm to 5 μm and drying the hollow silica precursors obtained by the filtering.

If necessary, the hollow silica precursors obtained may be cleaned by water, acid, alkali, an organic solvent, or the like.

<Step of Obtaining Hollow Silica Particles from Hollow Silica Precursors>

Subsequently, hollow silica particles are obtained by removing the oil cores from the hollow silica precursors (first-stage treatment) and then performing heat treatment at 700° C. or higher (second-stage treatment). The oil cores and the organic components such as a surfactant are removed in the first-stage treatment and the hollow silica particles are baked in the second-stage treatment to densify the shells.

Examples of method for removing the oil cores include a method of combustion-decomposing the oil by baking the hollow silica precursors, a method of evaporating the oil by drying, a method of decomposing the oil by adding a proper additive, and a method of extracting the oil using an organic solvent or the like. Among these example methods, from the viewpoints of reduction of oil residues and the work efficiency of the heat treatment performed at 700° C. or higher, a method of performing heat treatment at 700° C. or higher after combustion-decomposing the oil cores by baking the hollow silica precursors is preferable.

A specific description will be made below using, as an example, the method of removing the oil cores by baking the hollow silica precursors.

In the first-stage treatment, since it is necessary to heat-decomposing the oil in the hollow particles, the treatment temperature of baking is preferably 30° C. or higher, more preferably 100° C. or higher, further preferably 200° C. or higher, particularly preferably 250° C. or higher, and most preferably 300° C. or higher. In the case where the baking temperature is too high, the silica shells are densified excessively to make it difficult to remove organic components existing inside the particles. Thus, it is preferable that the baking temperature be lower than the second-stage heat treatment temperature by 100° C. or more, more preferably by 300° C. or more and further preferably by 400° C. or more.

To remove the oil cores and organic components sufficiently, it is preferable that the baking time of the first-stage treatment be 5 minutes or longer, more preferably 1 hour or longer, and further preferably 3 hours or longer. From the viewpoint of work efficiency, it is preferable that the baking time of the first-stage treatment be 12 hours or shorter, more preferably 8 hours or shorter and further preferably 6 hours or shorter.

The first-stage treatment may be performed either at a constant baking temperature for a prescribed time or stepwise at plural temperatures. Also, in the case where the treatment is performed at plural temperatures, from the viewpoint of work efficiency, the treatment be performed for the above-mentioned baking time.

Subsequently, in the second-stage treatment, heat treatment is performed at 700° C. or higher. In addition, the temperature of the hollow silica precursors may be returned to room temperature after the first-stage treatment before the second-stage treatment. Alternatively, the temperature of the hollow silica precursors may be increased to the heat treatment temperature of the second-stage treatment from a state that the baking temperature of the first-stage treatment is maintained.

The heat treatment temperature is more preferably 750° C. or higher, further preferably 800° C. or higher. Since amorphous silica is crystallized in the case where the temperature is too high, the heat treatment temperature is preferably 1,200° C. or lower, more preferably 1,150° C. or lower, further preferably 1,000° C. or lower, particularly preferably 950° C. or lower, and most preferably 900° C. or lower.

To increase the degree of densification of the shell layers, it is preferable that the heat treatment time of the second-stage treatment be 1 hour or longer, more preferably 3 hours or longer. From the viewpoint of work efficiency, it is preferable that the heat treatment time of the second-stage treatment be 12 hours or shorter, more preferably 8 hours or shorter and further preferably 6 hours or shorter.

Since the hollow silica particles obtained by the above steps may be aggregated by the drying or baking step, and thus may be disintegrated into a handleable aggregation size. The disintegration method may, for example, be a method using a mortar, a method using a dry or wet ball mill, a method using a sieve shaker, or a method using a disintegrator such as a pin mill, a cutter mill, a hammer mill, a knife mill, or a roller mill. A preferable aggregation diameter range of secondary particles is as described above.

Having densified shell layers, the hollow silica particles according to the present invention are low in the permeability for a solvent when added to any of various solvents such as water and oil. Since the hollow silica particles are high in the dispersibility in various solvents such as water, oil, or fluororesin, precipitation is suppressed by setting the specific gravity of hollow silica particle close to the specific gravity of a solvent used. Furthermore, specific properties that the hollow particles exhibit in a solvent can be maintained.

Thus, the hollow silica particles according to the present invention have the following features. Since the hollow silica particles according to the present invention can be controlled so as to be unprecipitation by adjusting their specific gravity, they are superior to non-hollow silica particles in being high in scattering ability in an ultraviolet and visible range and hence in concealment. Furthermore, they are superior to titanium oxide particles in that they are low in toxicity, exhibit no photocatalytic prosperity, and can be controlled so as to be unprecipitation by adjusting their specific gravity. Still further, they are superior to resin hollow particles in being low in environment contamination and high in heat resistance and safety. They can be used as an additive that are characterized in being low in environmental loads, skin-friendly, and easy to use because the particles are dispersed easily.

As such, the hollow silica particles according to the present invention can be used in various fields and can be used for, for example, cosmetic pigments, low refractive index materials, insulation fillers, heat insulation fillers, low permittivity fillers, white pigments, drug carriers, perfume carriers, agrochemical chemical carriers, ultraviolet scattering agents.

EXAMPLES

Although the invention will be described below in more detail by Examples, the invention is not limited to them. In the following description, common components employ the same substance. Symbol "%" means "mass %" unless otherwise specified explanation. Examples 1-3, 32, and 33 are Comparative Examples and Examples 4-31, 34, and 35 are Inventive Examples.

Test Example 1

Examples 1-6

Preparation of Emulsion:

7 g of an EO-PO-EO block copolymer ("Pluronic F68" produced by ADEKA Corporation) was added to 1,250 g of pure water and stirred until being dissolved. Crude emulsion was prepared by adding 42 g of n-dodecane to a resulting aqueous solution and stirring a resulting liquid using a homogenizer produced by IKA-Werke GmbH & Co. KG until the entire liquid becomes uniform.

Fine emulsion was produced by emulsifying this crude emulsion three times at the pressure of 400 bar using a high-pressure emulsifier ("LAB2000" produced by SMT Co., Ltd.).

First-Stage Shell Formation:

First-stage shell formation and second-stage shell formation were performed using a glass reaction tank having a capacity of 2 L. The fine emulsion obtained above was used after being left to stand at room temperature (25° C.) for 15 hours.

41 g of a diluted sodium silicate aqueous solution ($SiO_2$ concentration: 10.4 mass %, $Na_2O$ concentration: 3.6 mass %) and 2 M hydrochloric acid were added to 1,300 g of the fine emulsion so that the pH became equal to 2 (condition (i)), and a resulting liquid was stirred well while the temperature was kept at 25° C. (condition (iii)).

1 M sodium hydroxide aqueous solution was dropped slowly to this liquid while the liquid was stirred well so that the pH became equal to 5 (condition (ii)), thereby obtaining oil core-silica shell particle dispersion. The oil core-silica shell particle dispersion thus obtained was held and matured.

Second-Stage Shell Formation:

The entire oil core-silica shell particle dispersion obtained by the first-stage shell formation was heated to 70° C. and 1 M NaOH was added slowly while the liquid was stirred so that the pH became equal to 9.

Subsequently, 460 g of a diluted sodium silicate aqueous solution ($SiO_2$ concentration: 10.4 mass %, $Na_2O$ concentration: 3.6 mass %) and 0.5 M hydrochloric acid were added gradually so that the pH became equal to 9.

A resulting suspension was held at 70° C. for 2 days and then cooled to room temperature slowly, thereby obtaining a hollow silica precursor dispersion.

Filtration, Drying, and Baking:

The entire hollow silica precursor dispersion was filtered by pressure filtration (pressure: 0.28 MPa) using 0.45 μm-hydrophilic PTFE membrane filter.

A cake obtained after the filtration was dried in a nitrogen atmosphere at 60° C. for 1 hour and then at 400° C. for 4 hours (temperature increase rate: 5° C./min), thereby obtaining hollow silica precursors by removing organic components.

The hollow silica precursors obtained were divided into six groups and the hollow silica precursors belonging to each group were baked for 4 hours at a baking temperature shown in Table 1 (temperature increase rate: 5° C./min), and shells were baked highly, thereby obtaining hollow silica particles.

Evaluation:

The hollow silica particles of each of Examples 1-6 were subjected to the following tests.

1. Scanning Electron Microscope Image

FIG. 1 shows a scanning electron microscope image (SEM image) of hollow silica particles obtained in Example 6. The SEM image was observed with an acceleration voltage of 3 kV using "S4800" produced by Hitachi High-Tech Corporation. As shown in FIG. 1, it was found from open particles included as part of the hollow silica particles that the hollow silica particles are hollow.

Diameters (DL) of circumscribed circles and diameters (DS) of inscribed circles of 100 optional particles shown in FIG. 1 were measured and ratios (DS/DL) of the diameters (DS) of the inscribed circles to the diameters (DL) of the circumscribed circles were calculated. A sphericity calculated from an average of the ratios (DS/DL) was equal to 0.91. Furthermore, it was found that there was a size distribution because there existed particles having sizes of from about 100 nm to 1 μm. Primary particle sizes of 100 optional particles were measured and an average was calculated from a distribution obtained by tallying up them. A resulting average primary particle size was 370 nm.

2. Aggregation Size

The hollow silica particles obtained in Example 6 were subjected to a measurement using a diffractive scattering particle distribution measuring instrument (MT3300) produced by Microtrac BEL Corp. An average of two measured median values of particle size distributions (diameter) was calculated to obtain an aggregation size (D50) of 12 μm.

3. Specific Surface Area

The BET specific surface areas, determined by a nitrogen absorption method, of the hollow silica particles obtained in Examples 1-6 are shown in Table 1. The BET specific surface areas were measured by a single-point method by a full automatic specific surface area analyzer "Macsorb" produced by Mountech Co., Ltd. using a mixed gas (absorption gas: nitrogen (30%), carrier gas: helium (70%)). It is considered that the shells were densified because the BET specific surface area decreased as the baking temperature increased.

4. Finding of Pore Size Peak

Whether a pore size peak was found by a nitrogen absorption method in the hollow silica particles obtained in each of Examples 1-6 is shown in Table 1. A pore size peak was measured using a pore size distribution analyzer "3Flex" produced by Micromeritics Instruments Corporation. A peak position is shown in the case where presence of a pore size peak was found and "none" is shown in the case where no pore size peak was found. It is considered that the shells were densified because a pore size peak came not to be found by the nitrogen absorption method as the baking temperature increased.

5. Density Measurement Using Specific Gravity Bottle

A density in water was measured using a 10 mL Gay-Lussac type specific gravity bottle. As pretreatment, a sample and water were put into the specific gravity bottle and the specific gravity bottle containing the sample and water was put in an airtight container made of PTFE and left to stand for 16 hours in a constant temperature chamber kept at 110° C. A density was measured after the specific gravity bottle containing the sample and water was taken out of the constant temperature chamber and cooled to room temperature. Results are shown in Table 1.

In Examples 1-3, it is considered that water permeated because measured densities were close to the silica true density (about 2.2 g/cm$^3$). In Examples 4-6, it is considered that water did not permeate and hollow portions remained because measured densities were lower than 2.00 g/cm$^3$.

6. Density Measurement Using Dry Pycnometer

A density was measured using a dry pycnometer ("AccuPycII 1340" produced by Micromeritics Instruments Corporation). Measurement conditions were as follows:
sample cell: 10 cm$^3$ cell;
sample weight: 1.5 g;
measurement gas: helium or oxygen;
number of times of purging: 30 times;
purge treatment charging pressure: 135 kPag;
cycle number: 10 times;
cycle charging pressure: 135 kPag; and
pressure equilibrium ending rate: 0.05 kPag/min.

Results are shown in Table 1. In the case where helium was used as a measurement gas, a density value of about 2.2 g/cm$^3$ which is equivalent to the silica true density was obtained for each sample, which indicates that helium gas passed the shells and entered the insides of hollow silica. On the other hand, in the case where oxygen gas was used, a density value of about 1.1 g/cm$^3$ was obtained in Examples 4-6. It is considered that a particle density of what did not include the insides of hollow silica was obtained because the oxygen gas passed the shells at a low speed. It is considered that in Examples 1-3 a value that was larger than the true density was obtained because the oxygen gas passed through the shells or part of the oxygen gas aggregated adjacent to or was absorbed on holes or an error "impossible to measure" occurred because the pressure did not achieve equilibrium in a prescribed time.

Based on these results, it is considered that the hole sizes of shells decreased as the baking temperature increased and that in Examples 4-6 the hole sizes became equivalent to or smaller than the oxygen molecule diameter.

TABLE 1

| | Second-stage baking temperature ° C. | BET specific surface area m$^2$/g | Density | | | Pore size peak position mm |
| | | | Specific gravity bottle | Dry pycnometer | | |
| | | | Water g/cm$^3$ | Helium g/cm$^3$ | Oxygen g/cm$^3$ | |
|---|---|---|---|---|---|---|
| Example 1 | 550 | 71 | 2.13 | 2.19 | 11.82 | 4 |
| Example 2 | 600 | 61 | 2.11 | 2.22 | 6.11 | 4 |
| Example 3 | 650 | 57 | 2.02 | 2.23 | Impossible to measure | 4 |
| Example 4 | 700 | 52 | 1.18 | 2.23 | 1.14 | None |
| Example 5 | 750 | 47 | 1.07 | 2.26 | 1.12 | None |
| Example 6 | 800 | 41 | 1.06 | 2.24 | 1.09 | None |

Test Example 2

Examples 7-14

Hollow silica particles were manufactured by the same method as in Example 6 except that the following conditions of the first-stage shell forming reaction were changed to ones shown in Table 2.
  i) pH after addition of a sodium silicate aqueous solution;
  ii) pH after addition of 1 M NaOH; and
  iii) reaction temperature at the time of formation of first-stage shells.

TABLE 2

| | Conditions of first-stage shell forming reaction | | |
|---|---|---|---|
| | (i) | (ii) | (iii) |
| Example 7 | pH 2 | pH 5 | 25° C. |
| Example 8 | pH 2 | pH 6 | 40° C. |
| Example 9 | pH 1 | pH 6 | 40° C. |
| Example 10 | pH 2 | pH 4 | 40° C. |
| Example 11 | pH 1 | pH 4 | 40° C. |
| Example 12 | pH 3 | pH 6 | 40° C. |
| Example 13 | pH 2 | pH 6 | 40° C. |
| Example 14 | pH 2 | pH 6 | 30° C. |

Examples 15-17

Hollow silica particles were manufactured by the same method as in Example 14 except that sulfuric acid was used in place of hydrochloric acid and glass reaction tanks having capacities of 2 L, 5 L, and 10 L were used in Examples 15, 16, and 17, respectively.

Examples 18-21

Hollow silica particles were manufactured by the same method as in Example 14 except that the silica addition amount with respect to the oil used in forming the cores was changed. More specifically, the ratio of the silica addition amount to the amount of oil was set at 1.6, 1.8, 2.2 and 0.8 in Examples 18, 19, 20, and 21, respectively, whereas it was 1.2 in Example 14.

Examples 22-24

Hollow silica particles were manufactured by the same method as in Example 8 except that the step of setting the pH at 9 by adding 1 M NaOH in the second-stage shell formation was changed so as to be executed quickly. More specifically, NaOH was added in 1 minute, 5 minutes, and 10 minutes in Examples 22, 23, and 24, respectively.

Examples 25-29

Hollow silica particles were manufactured by the same method as in Example 14 except that the leaving-to-stand time and temperature after the production of fine emulsion were changed. More specifically, they were set at 25° C. and 12 hours, 25° C. and 24 hours, 25° C. and 192 hours, 25° C. and 112 hours, and 70° C. and 15 hours, respectively, in Examples 25, 26, 27, 28, and 29, respectively.

Evaluation:

The hollow silica particles of each of Examples 7-29 were subjected to the following tests.

1. Sphericity and Average Primary Particle Size

A sphericity and an average primary particle size were determined by the same methods as in Example 6 using a scanning electron microscope. Results are shown in Table 3.

2. Aggregation Size of Secondary Particles

An aggregation size (D50) of secondary particles was determined by the same method as in Example 6. Results are shown in Table 3.

3. Specific Surface Area

A specific surface area was determined by the same method as in Examples 1-6. Results are shown in Table 3.

4. Density Measurement Using Dry Pycnometer

A density was measured using a dry pycnometer by the same method as in Examples 1-6. Results are shown in Table 3.

5. Hollow Particle Ratio

In the case where a cake after filtration and before removing oil cores is loosened and air-dried for one night, an oil component in open particles is evaporated whereas that in completely covered hollow particles is held therein. A weight change by heat treatment in the case that all of a prepared oil component had evaporated (hollow particle ratio: 0%) and that in the case that all of a prepared oil component was kept held (hollow particle ratio: 100%) were calculated from prepared amounts of raw materials, and a hollow particle ratio was estimated from a weight change that occurred when a filtered cake was air-dried for one night and heat-treated to 800° C. Results are shown in Table 3.

6. Oil Absorption

An oil absorption was determined according to JIS K 5101-13-1 (established in year 2004). Results are shown in Table 3. It is considered that the spaces inside open particles contributed to the oil absorption because the oil absorption was smaller as the hollow particle ratio was larger.

7. Shell Thickness

A shell thickness was determined by measuring a shell thickness of each particle by a transmission electron microscope (TEM). A TEM image was observed by scattering hollow silica particles onto a polyvinyl formal film that had been subjected to hydrophilizing treatment and observing them using "HT7700" produced by Hitachi, Ltd. at an acceleration voltage 100 kV. An average of shell thickness values of optional 50 particles was employed as a shell thickness.

TABLE 3

| | Average primary particle size nm | Sphericity — | Aggregation size (D50) μm | Specific surface area $m^2/g$ | Density | | Hollow particle ratio % | Oil absorption ml/100 g | Shell thickness nm |
|---|---|---|---|---|---|---|---|---|---|
| | | | | | Helium $g/cm^3$ | Oxygen $g/cm^3$ | | | |
| Example 7 | 440 | 0.98 | 3.1 | 50 | 2.24 | 1.28 | 65 | 435 | 23 |
| Example 8 | 360 | 0.95 | 29.3 | 33 | 2.27 | 0.82 | 87 | 264 | 22 |
| Example 9 | 480 | 0.88 | 0.3 | 38 | 2.26 | 1.99 | 15 | 820 | 21 |
| Example 10 | 420 | 0.98 | 37.7 | 66 | 2.28 | 1.61 | 42 | 612 | 22 |

TABLE 3-continued

|  | Average primary particle size nm | Sphericity — | Aggregation size (D50) μm | Specific surface area m²/g | Density Helium g/cm³ | Density Oxygen g/cm³ | Hollow particle ratio % | Oil absorption ml/100 g | Shell thickness nm |
|---|---|---|---|---|---|---|---|---|---|
| Example 11 | 400 | 0.96 | 30.9 | 62 | 2.25 | 1.99 | 14 | 828 | 21 |
| Example 12 | 440 | 0.95 | 32.3 | 108 | 2.32 | 1.31 | 63 | 450 | 23 |
| Example 13 | 350 | 0.96 | 30.9 | 32 | 2.21 | 1.21 | 70 | 390 | 22 |
| Example 14 | 360 | 0.95 | 4.4 | 30 | 2.24 | 0.84 | 83 | 295 | 22 |
| Example 18 | 490 | 0.98 | 20.3 | 32 | 2.31 | 0.97 | 68 | 412 | 27 |
| Example 19 | 310 | 0.97 | 14.5 | 31 | 2.20 | 1.28 | 40 | 629 | 31 |
| Example 20 | 376 | 0.96 | 17.5 | 30 | 2.16 | 1.14 | 64 | 443 | 38 |
| Example 21 | 400 | 0.97 | 21.4 | 37 | 2.17 | 1.42 | 15 | 824 | 17 |
| Example 22 | 410 | 0.97 | 2.2 | 35 | 2.35 | 1.26 | 60 | 474 | 21 |
| Example 23 | 340 | 0.95 | 5.5 | 34 | 2.15 | 0.94 | 80 | 318 | 21 |
| Example 24 | 320 | 0.98 | 14.1 | 29 | 2.33 | 1.14 | 67 | 419 | 22 |
| Example 25 | 300 | 0.96 | 12.6 | 38 | 2.12 | 1.23 | 71 | 388 | 22 |
| Example 26 | 305 | 0.94 | 10.2 | 32 | 2.22 | 1.17 | 73 | 373 | 21 |
| Example 27 | 600 | 0.97 | 9.5 | 35 | 2.27 | 0.89 | 77 | 342 | 25 |
| Example 28 | 550 | 0.93 | 5.3 | 27 | 2.29 | 0.92 | 79 | 326 | 27 |
| Example 29 | 730 | 0.98 | 2.0 | 25 | 2.26 | 0.68 | 89 | 248 | 31 |

It was found from the results of Table 3 that the oil absorption decreased as the hollow particle ratio increased. It is considered from this result that the spaces inside damaged particles that are open partially contributed to the oil absorption. It has therefore been found that the oil absorption can be adjusted by the proportion of damaged particles, that is, the hollow particle ratio.

Test Example 3

Particle size distributions of the hollow silica particles of Examples 7-14 and 22-24 that were manufactured in Test Example 2 were measured.

A particle size distribution was measured using a particle size distribution measuring instrument ("MT3300" of Microtrac BEL Corp.) that employs a laser diffraction method. A measurement was carried out after causing dispersion by applying ultrasonic waves for 60 seconds three times in the instrument. Two measurements were carried out and each was carried out in 120 seconds, and an average of the two measurements is shown in Table 4.

A particle size distribution that was obtained in the above manner is not a particle size distribution of single hollow silica particles but a particle size distribution of aggregates that were formed by secondary aggregation. It was found from Table 4 that the sizes of aggregates that were formed by secondary aggregation were distributed in a range of several hundreds of nanometers to several tens of micrometers.

TABLE 4

|  | D10 (μm) | D50 (μm) | D90 (μm) |
|---|---|---|---|
| Example 7 | 1.2 | 3.1 | 6.1 |
| Example 8 | 4.8 | 29.3 | 51.8 |
| Example 9 | 0.2 | 0.3 | 15.7 |
| Example 10 | 23.5 | 37.7 | 58.1 |
| Example 11 | 10.0 | 30.9 | 56.5 |
| Example 12 | 9.9 | 32.3 | 59.6 |
| Example 13 | 7.5 | 30.9 | 53.5 |
| Example 14 | 0.4 | 4.4 | 22.1 |
| Example 21 | 0.5 | 2.2 | 4.1 |

TABLE 4-continued

|  | D10 (μm) | D50 (μm) | D90 (μm) |
|---|---|---|---|
| Example 22 | 0.4 | 5.5 | 19.7 |
| Example 23 | 5.4 | 14.1 | 27.1 |

Test Example 4

Impurity concentrations of hollow silica particles of each of Examples 14-17 that were manufactured in Test Example 2 were measured.

In the measurement, amounts of alkali metals and alkaline earth metals were measured according to inductivity coupled plasma atomic emission spectroscopy using "ICPE-9000" produced by Shimadzu Corporation after removing silicon as main component by adding perchloric acid and hydrofluoric acid to hollow silica particles and then performing strong heating.

An aqueous dispersion having a concentration of 14% was prepared using hollow silica particles of each of Examples 14-17 and left to stand for 17 hours in a constant temperature chamber kept at 110° C. This was to accelerate permeation of water to the insides of the hollow silica particles through the shells. Subsequently, the aqueous dispersion was diluted to 0.008%, an absorbance at a wavelength of 310 nm was measured using a spectrophotometer ("UV-1280" produced by Shimadzu Corporation) to also evaluate UV scattering ability, and water permeability comparison was made. Results are shown in Table 5.

It was found that the absorbance at a wavelength of 310 nm was high and shells through which water does not permeate easily were formed in the case where the concentrations of alkali metals such as Na and alkaline earth metals such as Ca were high. It is known that alkali metals and alkaline earth metals influence dissolution and reprecipitation of silica, and it is considered that the presence of them accelerates densification of shells during heat treatment.

TABLE 5

| | Impurity concentration (ppm) | | | | | | | Absorbance |
| --- | --- | --- | --- | --- | --- | --- | --- | --- |
| | Na | Ca | Mg | K | Al | Fe | Ti | at 310 nm |
| Example 14 | 1,020 | 63 | 23 | 132 | — | — | — | 0.84 |
| Example 15 | 788 | 51 | 17 | 107 | 302 | 117 | 135 | 0.65 |
| Example 16 | 419 | 34 | 11 | 29 | 275 | 107 | 124 | 0.24 |
| Example 17 | 467 | 386 | 94 | 278 | 292 | 104 | 127 | 0.56 |

Test Example 5

An absorbance ratio of hollow silica particles of each of Examples 1-6 manufactured in Test Example 1 was measured.

An aqueous dispersion of 250 mass ppm was prepared using hollow silica particles of each of Examples 1-6 and the hollow silica particles were dispersed by applying ultrasonic waves for 30 seconds. A quartz cell (ASLAB quartz cell (double transparent) "Q-102" produced by AS ONE Corporation, having 4.5 mm of depth×12.5 mm of width×45 mm of height, and 2 mm of optical path length×10 mm of optical path width) was used in the absorbance measurement. To evaluate UV scattering ability, an absorbance at a wavelength of 310 nm was measured using a spectrophotometer ("UV-1280" produced by Shimadzu Corporation). At this time, a setting was made so that the center of a beam was located at a position that was distant from the lower end of the cell by 15 mm. Dispersion stability was evaluated using absorbance ratios measured after leaving to stand at room temperature for 1 hour, 2 hours, and 15 hours when immediately after preparation of the aqueous dispersion is set to 0 hour and the absorbance at 0 hour is set to 1. Results are shown in Table 6.

It is considered that the absorbance ratios that were obtained after a lapse of 1 hour indicate that the absorbance decreased because water permeated into the insides of open particles or hollow silica particles having a water-permeable shell and, as a result, their specific gravities became close to the true density of silica and they precipitate. It is also considered that after a lapse of 2 hours the absorbance decreased because the hollow silica particles gradually precipitated or floated up according to the specific gravities of the hollow silica particles.

TABLE 6

| | Absorbance ratio at 310 nm | | | |
| --- | --- | --- | --- | --- |
| | 0 hour | After 1 hour | After 2 hours | After 15 hours |
| Example 1 | 1.00 | 0.37 | 0.34 | 0.31 |
| Example 2 | 1.00 | 0.74 | 0.71 | 0.63 |
| Example 3 | 1.00 | 0.94 | 0.89 | 0.75 |
| Example 4 | 1.00 | 0.97 | 0.94 | 0.83 |
| Example 5 | 1.00 | 0.98 | 0.95 | 0.83 |
| Example 6 | 1.00 | 0.98 | 0.96 | 0.84 |

Test Example 6

Figure 2:
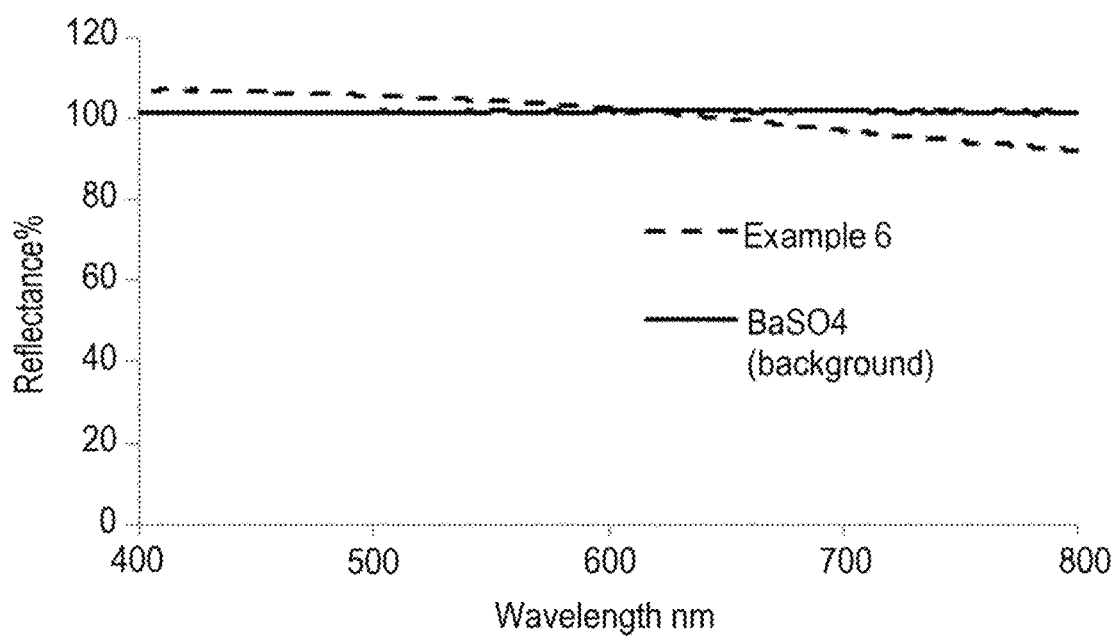
FIG. 2 shows an optical spectrum of the hollow silica particles obtained in Example 6.

An optical spectrum of hollow silica particles of each of Examples 1-6 that were manufactured in Test Example 1 was obtained An optical spectrum was obtained by measuring diffuse reflectance values in a wavelength range of from 300 nm to 800 nm using a spectrophotometer ("UV-3100PC" and "MPC-3100" produced by Shimadzu Corporation) by putting hollow silica particles of 0.1 g of each of Examples 1-6 into a powder sample holder (produced by Shimadzu Corporation) for an attachment device of an integrating sphere. The incident angle of measurement light was set at 0°. FIG. 2 shows an optical spectrum of the hollow silica particles of Example 6 obtained at this time.

It was seen from FIG. 2 that no peak was found at any particular wavelength and hence there was no wavelength dependence. Hollow silica particles of each of Examples 1-5 showed an optical spectrum that was similar to the optical spectrum of those of Example 6.

Test Example 7

A reflectance, an L* value, and a b* value of an optical layer that was formed using hollow silica particles of each of Examples 8-14 manufactured in Test Example 2 were measured.

A fluororesin coating agent ("Obbligato" produced by AGC COAT-TECH Co., Ltd.) (18.2 g), hollow silica particles of each of Examples 8-14 (1.8 g), and an antifoaming agent ("SM-257" produced by Teikoku Printing Inks Mfg. Co., Ltd.) (0.5 g) were mixed and stirred at 200 rpm for 1 min using a kneading machine ("Awatori Rentaro" produced by THINKY CORPORATION). Then a hardener ("TPA-B80E" produced by Asahi Kasei Corporation) (6 g) was added and a resulting mixture was stirred further at 200 rpm for 1 min, thereby obtaining a coating liquid.

The coating liquid thus obtained was coated on one surface of a soda-lime silicate glass sheet ("KFL" produced by AGC Inc., length of 150 mm×width of 75 mm, average thickness: 3.2 mm) as a base layer to become a thickness of about 30 μm using a screen printing machine ("MTVC-320" produced by Micro-tec Co., Ltd.). Subsequently, the coat layer was cured by heat-drying for 30 minutes in a constant temperature chamber kept at 130° C., thereby obtaining an optical layer including the glass sheet as the base layer and a coat layer formed on the base layer.

Reflectance of the optical layer were measured in a wavelength range of from 200 to 1,500 nm at intervals of 5 nm at a scanning rate of 1,000 nm/min using a spectrophotometer ("V-670" produced by JASCO Corporation). A ratio of a reflectance at a wavelength of 400 nm to a reflectance at a wavelength of 800 nm is shown in Table 7.

The reflection at the wavelength of 400 nm is stronger and an optical layer looks bluish as this reflectance ratio increases. It was found that the reflectance ratio of the optical layer that was formed using hollow silica particles of each of Examples 8-14 was 1.4 or smaller and hence did not look bluish.

L* and b* of the optical layer were measured using a spectroscopic colorimeter ("SD6000" produced by Nippon Denshoku Industries Co., Ltd.). The measurement was performed by setting a black board as a background of a sample and water was placed between the black board and the sample. Measurement light was input from the glass substrate side. Measurement results are shown in Table 7.

It was confirmed that the L* value of the optical layer was larger and its brightness was higher when hollow silica particles having a larger hollow particle ratio was used. It is considered that light is scattered more and the brightness increases as more particles in which a hollow structure is maintained exist in a mixed resin. The b* value of every sample was −5 or larger, also from which result it was found that the sample was white rather than bluish.

TABLE 7

|  | 400 nm/800 nm reflectance ratio | L* value | b* value |
|---|---|---|---|
| Example 8 | 1.07 | 51.6 | −2.1 |
| Example 9 | 1.32 | 41.1 | −4.0 |
| Example 10 | 1.08 | 44.7 | −3.4 |
| Example 11 | 1.09 | 40.4 | −4.1 |
| Example 12 | 1.33 | 46.1 | −2.3 |
| Example 13 | 1.08 | 49.0 | −2.4 |
| Example 14 | 1.36 | 52.3 | −2.6 |

Test Example 8

The particle strength of hollow silica particles of each of Examples 14 and 18-20 that were manufactured in Test Example 2 was measured.

2 g of hollow silica particles of each of Examples 14 and 18-20 were weighed out, they were put into a sealer bag ("Poli-flex bag" produced by Asahi Kasei Pax Corporation), the bag was sealed using a chamber-type vacuum sealer ("FCB-2000" produced by Fuji Impulse Co., Ltd.), and a prescribed hydrostatic pressure was applied for 1 minute using a CIP machine ("CPA-50" produced by NPa System Co., Ltd.). A density of a sample was measured before and after the hydrostatic pressure treatment by an oxygen pycnometer method, thereby obtaining a proportion of particles that were damaged by the hydrostatic pressure treatment. A pressure at which the proportion of particles damaged by the hydrostatic pressure treatment became 10% is shown in Table 8.

Since the pressure that was necessary to damage 10% of the particles became higher as the silica addition amount increased, it was found that the strength of particles was increased.

TABLE 8

|  | Silica/oil addition amount ratio | Pressure (MPa) at which proportion of particles damaged by hydrostatic pressure treatment became 10% |
|---|---|---|
| Example 14 | 1.2 | 6 |
| Example 18 | 1.6 | 10 |
| Example 19 | 1.8 | 24 |
| Example 20 | 2.2 | 32 |

Test Example 9

An amount of surface silanol groups of hollow silica particles of each of Examples 1-6 that were manufactured in Test Example 1 was measured.

Hollow silica particles of each of Examples 1-6 were put on a diamond plate and subjected to an IR measurement using "Nic-plan/Nicolet6700" produced by Thermo Fisher Scientific Inc. A silanol amount on particle surfaces was evaluated by determining an Si—OH/Si—O—Si peak intensity ratio after making normalization by a value at 800 cm$^{-1}$ where an Si—O—Si peak occurred and making baseline adjustment at 3,800 cm$^{-1}$ where an Si—OH peak rose. Results are shown in Table 9.

It was found from the results shown in Table 9 that the Si—OH/Si—O—Si peak intensity ratio was smaller and the surface silanol amount was smaller as the baking temperature was higher.

TABLE 9

|  | Si—OH/Si—O—Si peak intensity ratio |
|---|---|
| Example 1 | 0.44 |
| Example 2 | 0.34 |
| Example 3 | 0.29 |
| Example 4 | 0.21 |
| Example 5 | 0.12 |
| Example 6 | 0.07 |

Test Example 10

A Raman spectrum and a solid $^{29}$Si-NMR spectrum of hollow silica particles of each of Examples 1 and 6 manufactured in Test Example 1 were obtained.

Figure 3:
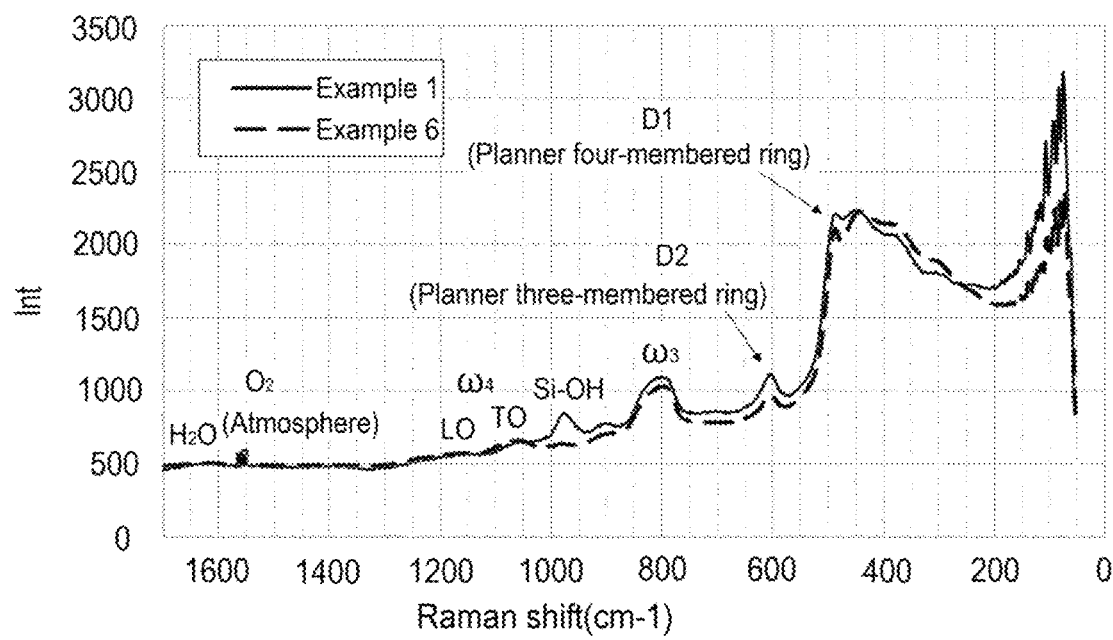
FIG. 3 shows a Raman spectrum of hollow silica particles obtained in each of Examples 1 and 6.

A Raman spectrum was obtained using "LabRAM HR Evolution" produced by HORIBA, Ltd. A measurement was carried out under conditions that the excitation wavelength was 532 nm, the power was 15 mW per sample, the objective lens magnification was ×100, the N.A. (Numerical Aperture) was 0.8, the confocal aperture was a 200 μm pinhole, Grating 600 was used, the center wavelength was 950 cm$^{-1}$, the exposure time was 10 sec, and the number of times of accumulation was 20 times. Results of Examples 1 and 6 are shown in FIG. 3.

In Example 1 in which the baking temperature was low, the intensity of an Si—OH peak was high and a D2 peak (605 cm$^{-1}$) was high, and hence it is considered that Si—OH existed in a large number, the degree of crosslinking was low, and the number of unstable planar three-membered ring structures was large.

Figure 4:
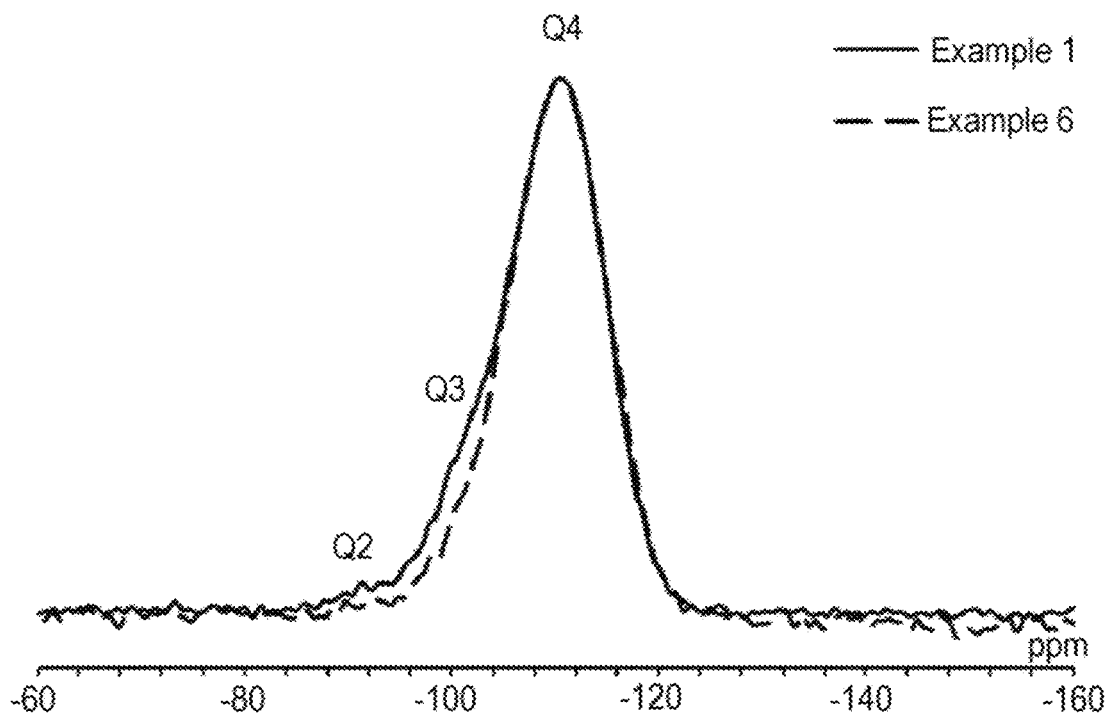
FIG. 4 shows a solid $^{29}$Si-NMR spectrum of hollow silica particles obtained in each of Examples 1 and 6.

Furthermore, a solid $^{29}$Si-NMR spectrum was obtained using "AVANCE-III-HD400" produced by Bruker Biospin Corporation. A measurement was carried out using 7 mm CP/MAS probe under conditions of D1=300 sec and NS=700 or 500. FIG. 4 shows a result of a measurement that was carried out by filling a 7.0 mm-diameter sample pipe made of ZrO$_2$ with a sample of each of Examples 1 and 6.

In Example 1 in which the baking temperature was low, since a Q3 peak that was detected in a low magnetic field-side shoulder of a Q4 peak was slightly higher in intensity, it is considered that Si—OH existed in a larger number.

Test Example 11

A water vapor absorption amount of hollow silica particles of each of Examples 1-6 manufactured in Test Example 1 was measured.

A water vapor absorption amount of hollow silica particles of each of Examples 1-6 was checked using water vapor as a gas by "3Flex" produced by Micromeritics Instruments Corporation. A maximum absorption amount of each sample is shown in Table 10.

From the results shown in Table 10, since the maximum absorption amount of water vapor was smaller as the baking temperature was higher, it was found that the number of portions (absorption sites) capable of absorbing water vapor was small.

TABLE 10

| | Maximum absorption amount $(cm^3/gSTP)/(m^2/g)$ |
|---|---|
| Example 1 | 4.2 |
| Example 2 | 3.7 |
| Example 3 | 2.7 |
| Example 4 | 1.7 |
| Example 5 | 1.1 |
| Example 6 | 1.0 |

Test Example 12

Example 30

31 g of hollow silica particles obtained in Example 14 of Test Example 2 and 1.3 g of phenylmethyl silicone (PMS) were dispersed in 200 g of toluene, and then the toluene was removed by evaporation at 140° C., thereby obtaining 32.3 g of hollow silica particles that were surface-treated by phenylmethyl silicone.

1500 g of ETFE ("Fluon ETFE88AXB" produced by AGC Inc.) and 32.3 g of the surface-treated hollow silica particles were dry-blended together, and then subjected to melt-kneading extrusion at 300° C. using a twin screw extruder, thereby obtaining pellets. The extrusion pressure at the time of pellet molding was 12 MPa. The pellet thus obtained was extrusion-molded at 300° C. using a single screw extruder whose outlet was connected to a T-die, thereby obtaining a film that was 102 μm in thickness.

Example 31

A pellet prepared in Example 30 was further dry-blended with ETFE of 19 times in amount and then extrusion-molded at 300° C. using a single screw extruder, thereby obtaining a film that was 251 μm in thickness.
Evaluation:
Optical properties of the film of each of Examples 30 and 31 were measured.
A film thickness was measured by a micrometer.
Haze of the film was measured using a haze meter ("NDH-5000" produced by Nippon Denshoku Industries Co., Ltd.)
Total light transmittance and parallel light transmittance of the film were measured according to JIS R 3106: 1998 using an ultraviolet-visible-near infrared (UV-VIS-NIR) spectrophotometer ("UV-3600" produced by Shimadzu Corporation).

A weathering test was conducted using an accelerated weathering test instrument ("Eye Super UV Tester" produced by Suga Test Instruments Co., Ltd.). In the weathering test, a cycle was employed in which condensation was caused at 63° C. for 2 hours and then ultraviolet irradiation was done at 1,600 W/m² for 10 hours.

Figure 5:
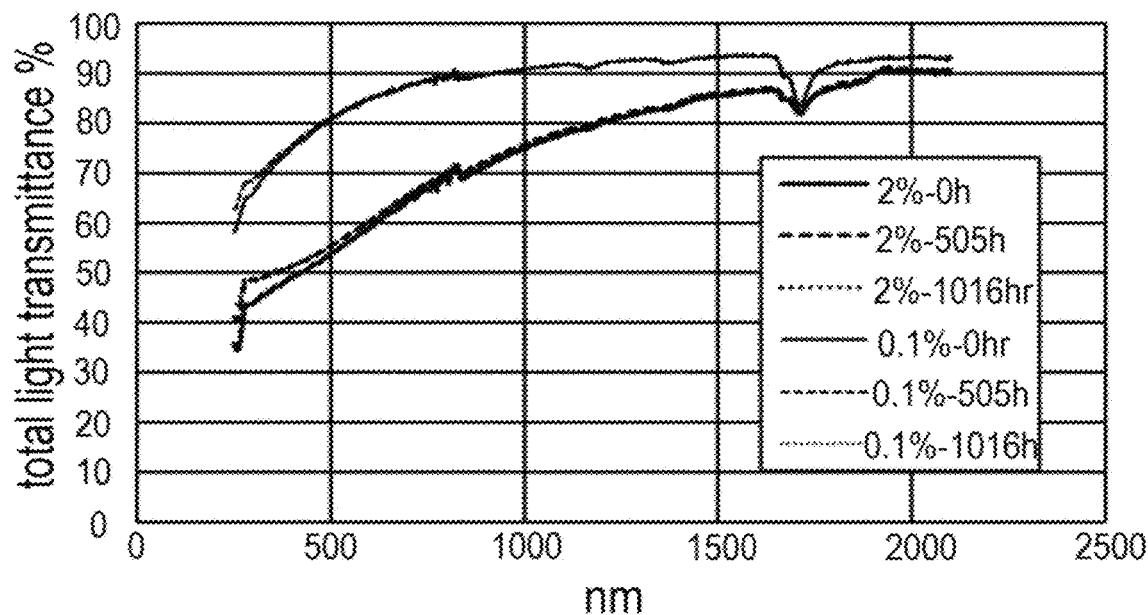
FIG. 5 shows total light transmittance, obtained before and after an accelerated weathering test, of a film produced in each of Examples 30 and 31.
Figure 6:
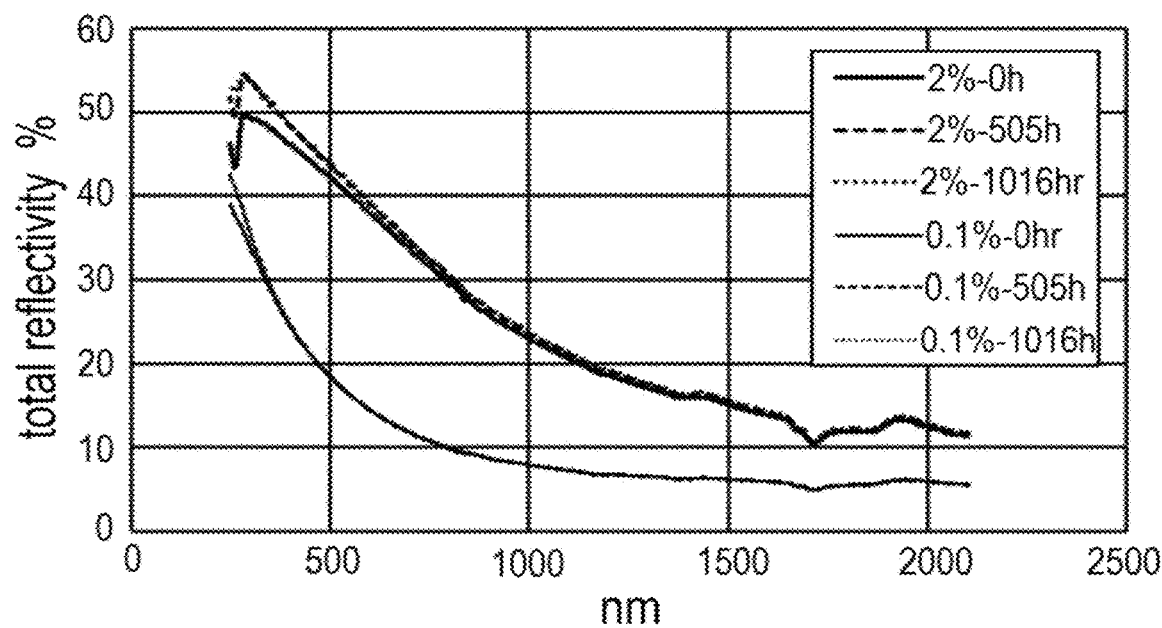
FIG. 6 shows parallel light transmittance, obtained before and after the accelerated weathering test, of the film produced in each of Examples 30 and 31.
Figure 7:
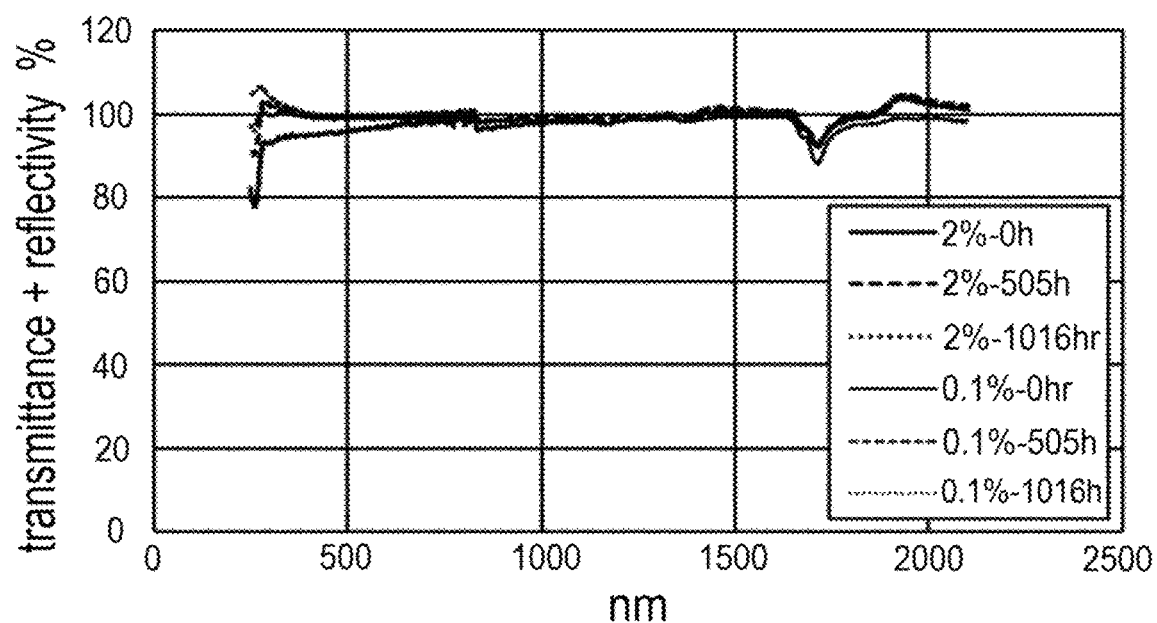
FIG. 7 shows the sums of the total light transmittance and the parallel light transmittance, obtained before and after the accelerated weathering test, of the film produced in each of Examples 30 and 31.

Initial optical properties and optical properties obtained after being subjected to the test using the accelerated weathering test instrument are shown in Table 11 and FIGS. 5, 6, and 7. FIGS. 5, 6, and 7 show a total light transmittance, a parallel light transmittance, and the sum of the total light transmittance and the parallel light transmittance, respectively.

It was found that the films of Examples 30 and 31 still exhibited stable performance without being affected by ultraviolet ray or humidity in the accelerated weathering test and dispersed light to the transmission side and the reflection side without absorbing energy over a broad wavelength range. Furthermore, no resin deterioration (i.e., increase in haze) by a photocatalyst was found.

TABLE 11

| | Hollow silica concentration (wt %) | Film thickness (μm) | Initial | | | Weathering test of 505 hours | | | Weathering test of 1,016 hours | | |
|---|---|---|---|---|---|---|---|---|---|---|---|
| | | | Total light transmittance (%) | Parallel light transmittance (%) | Haze (%) | Total light transmittance (%) | Parallel light transmittance (%) | Haze (%) | Total light transmittance (%) | Parallel light transmittance (%) | Haze (%) |
| Example 30 | 2 | 102 | 59.3 | 1.2 | 98.1 | 60.4 | 1.1 | 98.2 | 60.7 | 1.1 | 98.3 |
| Example 31 | 0.1 | 251 | 84.5 | 43.2 | 48.9 | 84.7 | 42.5 | 49.8 | 84.7 | 41.8 | 50.6 |

Test Example 13

Example 32

Hollow silica particles were manufactured by the same method as in Example 8 except that the pH at the time of second-stage shell formation was set at 7. The density of the hollow silica particles of Example 32 as measured by an oxygen pycnometer method was 2.77 g/cm³.

SEM images of hollow silica particles of Examples 32 and Example 8 were taken.

Figure 8:
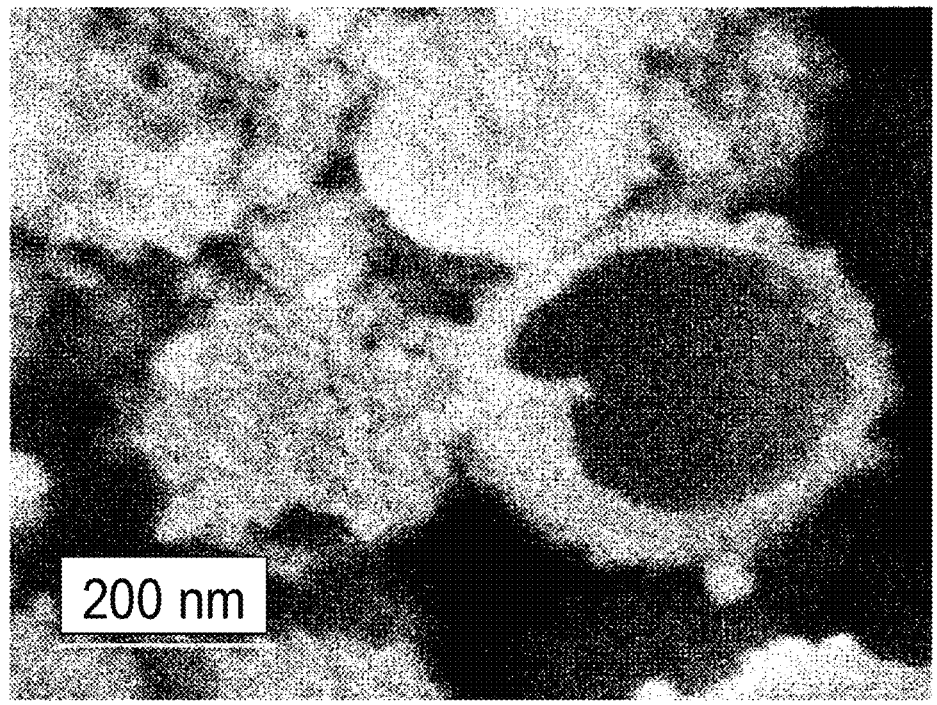
FIG. 8 shows a scanning electron microscope image (SEM image) of hollow silica particles obtained in Example 32.
Figure 9:
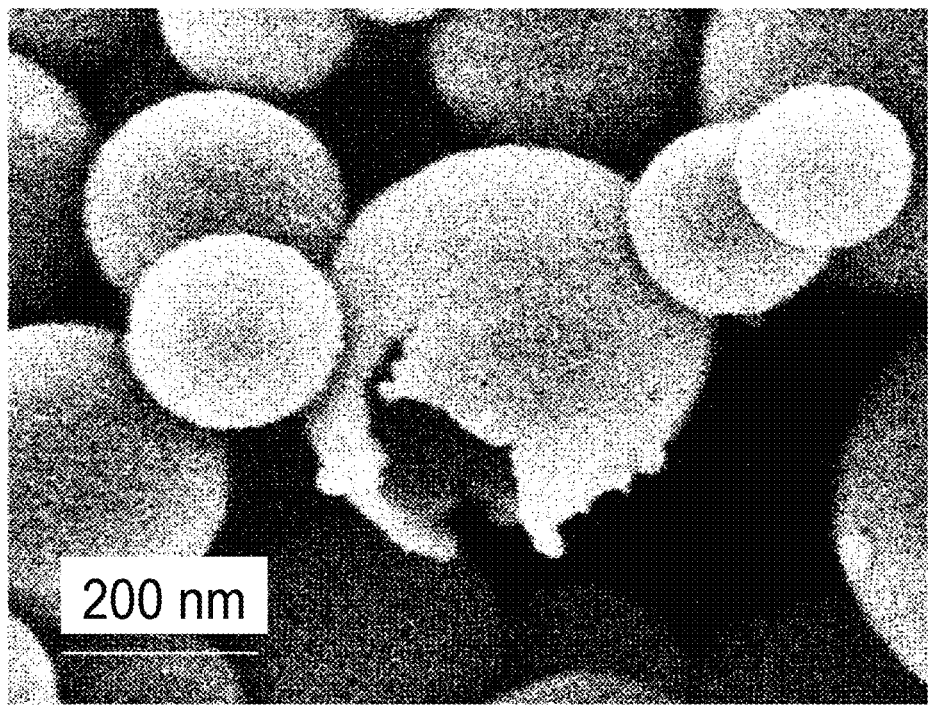
FIG. 9 shows a scanning electron microscope image (SEM image) of hollow silica particles obtained in Example 8.

The SEM images were observed at an acceleration voltage of 3 kV using "S4800" produced by Hitachi High-Tech Corporation. The SEM images of Examples 32 and Example 8 are shown in FIGS. 8 and 9, respectively.

It was found that the outside shell surfaces of hollow silica particles of Examples 32 were high in surface unevenness, that is, in such a form that fine particles of several tens of nanometers were aggregated. It was also found that the outside shell surfaces of hollow silica particles of Examples 8 were smooth, that is, low in surface unevenness.

Furthermore, it was found that when the inside shell surfaces of open particles of each of Examples 32 and 8 were observed they appeared low in surface unevenness and looked smooth. This is considered a feature that occurs because in the method for manufacturing hollow silica particles according to the present invention the step of adding a silica material is divided into two or more steps and first-stage silica coatings are formed by adding a first silica material to emulsion containing a surfactant in an acidic condition.

Test Example 14

Example 33

A fluororesin coating agent ("Obbligato" produced by AGC COAT-TECH Co., Ltd.) (27.29 g) and an antifoaming agent ("SM-257" produced by Teikoku Printing Inks Mfg. Co., Ltd.) (0.78 g) were mixed and stirred at 200 rpm for 1 minute using a kneading machine ("Awatori Rentaro" produced by THINKY CORPORATION). Then a hardener ("TPA-B80E" produced by Asahi Kasei Corporation) (9.09 g) was added and a resulting mixture was further stirred at 200 rpm for 1 minute, thereby obtaining a mixed liquid.

The mixed liquid thus obtained was put into a PE ointment bottle (made of high-density polyethylene, inner diameter: 50 mm) and cured by drying at room temperature for 3 days. Then a resin sheet was obtained by taking out a cured film.

Example 34

A resin sheet was produced by the same method as in Example 33 except that a mixed liquid was produced by further adding hollow silica particles of 2.91 g (an amount to become 10 wt % and 21 vol % after curing and drying) of Example 14 that were manufactured in Test Example 2.

Example 35

A resin sheet was produced by the same method as in Example 33 except that a mixed liquid was produced by further adding hollow silica particles of 2.91 g (an amount to become 10 wt % and 25 vol % after curing and drying) of Example 29 that were manufactured in Test Example 2.
Evaluation:

The resin sheets produced in each of Examples 33-35 were subjected to the following tests.
1. Thermal Conductivity Measurement A thermal conductivity was measured at 25° C. and normal pressure using a thermal conductivity measuring instrument ("FOX50" produced by EKO Instruments Co., Ltd.). Results are shown in Table 12.
2. Density Measurement A diameter of the resin sheet produced was measured using a scale. Furthermore, since a thickness of the resin sheet was also measured in the measurement using the thermal conductivity measuring instrument in which the resin sheet was sandwiched, a volume of the resin sheet was calculated from values of the diameter and the thickness. Then a weight of the resin sheet was measured by a weighing scale and a density was calculated. Results are shown in Table 12.

It was confirmed from Table 12 that an air layer was introduced in Examples 34 and 35 in which hollow silica particles were added by 10% because the density was lower than in Example 33 in which only fluororesin was used and that the thermal conductivity was thereby lowered by about 20%. It has been found from this result that the heat insulation performance can be improved by adding hollow silica particles according to the present invention to a resin sheet or a coating liquid.

TABLE 12

|  | Diameter × thickness of sample | Weight (g) | Density (g/cm³) | Thermal conductivity (W/mK) |
| --- | --- | --- | --- | --- |
| Example 33 | Diameter 50 mm × 55 mm | 17.2 | 0.40 | 0.124 |
| Example 34 | Diameter 50 mm × 69 mm | 16.6 | 0.31 | 0.102 |
| Example 35 | Diameter 50 mm × 70 mm | 18.7 | 0.34 | 0.104 |

Although the present invention has been described in detail by referring to the particular embodiment, it is apparent to those skilled in the art that various changes and modifications are possible without departing from the spirit and scope of the invention. The present application is based on Japanese Patent Application No. 2020-032046 filed on Feb. 27, 2020, and Nos. 2020-161378 and 2020-161379 both filed on Sep. 25, 2020, the disclosures of which are incorporated herein by reference.

The invention claimed is:

1. A hollow silica particle comprising:
a shell layer containing silica; and
a space formed inside the shell layer,
wherein the hollow silica particle has a particle density as measured by a dry pycnometer density measurement using helium gas of 2.00 g/cm³ or more and a particle density as measured by a dry pycnometer density measurement using oxygen gas of lower than 2.00 g/cm³.

2. The hollow silica particle according to claim 1, wherein the particle density as measured by the dry pycnometer density measurement using helium gas is from 2.00 g/cm³ to 2.40 g/cm³.

3. The hollow silica particle according to claim 1, wherein the particle density as measured by the dry pycnometer density measurement using oxygen gas is from 0.40 g/cm³ to 1.90 g/cm³.

4. The hollow silica particle according to claim 1, wherein the hollow silica particle has an average primary particle size of from 10 nm to 10 μm.

5. The hollow silica particle according to claim 1, wherein the hollow silica particle has a BET specific surface area of from 5 m²/g to 2,600 m²/g.

6. The hollow silica particle according to claim 1, wherein the hollow silica particle has a sphericity of from 0.8 to 1.0.

7. The hollow silica particle according to claim 1, wherein the hollow silica particle has an oil absorption of from 30 mL/100 g to 1,000 mL/100 g.

8. The hollow silica particle according to claim 1, wherein the hollow silica particle has an aggregation size (D50) of a secondary particle of from 0.1 μm to 50 μm.

9. A method for manufacturing a hollow silica particle according to claim 1, the method comprising:
obtaining a hollow silica precursor by forming a shell layer containing silica on an outer surface of a core;
removing the core from the hollow silica precursor; and
performing heat treatment at 700° C. or higher,
wherein the hollow silica particle has a particle density as measured by a dry pycnometer density measurement using helium gas of 2.00 g/cm³ or more and a particle density as measured by a dry pycnometer density measurement using oxygen gas of lower than 2.00 g/cm³.

10. The hollow silica particle according to claim 2, wherein the hollow silica particle has an average primary particle size of from 10 nm to 10 μm.

11. The hollow silica particle according to claim 2, wherein the hollow silica particle has a BET specific surface area of from 5 m²/g to 2,600 m²/g.

12. The hollow silica particle according to claim 2, wherein the hollow silica particle has a sphericity of from 0.8 to 1.0.

13. The hollow silica particle according to claim 2, wherein the hollow silica particle has an oil absorption of from 30 mL/100 g to 1,000 mL/100 g.

14. The hollow silica particle according to claim 2, wherein the hollow silica particle has an aggregation size (D50) of a secondary particle of from 0.1 μm to 50 μm.

15. The method according to claim 9, wherein the particle density as measured by the dry pycnometer density measurement using helium gas is from 2.00 g/cm$^3$ to 2.40 g/cm$^3$.

16. The method according to claim 9, wherein the hollow silica particle has an average primary particle size of from 10 nm to 10 μm.

17. The method according to claim 9, wherein the hollow silica particle has a BET specific surface area of from 5 m$^2$/g to 2,600 m$^2$/g.

18. The method according to claim 9, wherein the hollow silica particle has a sphericity of from 0.8 to 1.0.

19. The method according to claim 9, wherein the hollow silica particle has an oil absorption of from 30 mL/100 g to 1,000 mL/100 g.

20. The method according to claim 9, wherein the hollow silica particle has an aggregation size (D50) of a secondary particle of from 0.1 μm to 50 μm.

* * * * *